United States Patent
Katsuhara et al.

(10) Patent No.: US 12,203,817 B2
(45) Date of Patent: Jan. 21, 2025

(54) CONVEX SURFACE SHAPED ELECTROSTATIC CAPACITANCE TYPE PRESSURE SENSOR USED IN ELECTRONIC DEVICES

(71) Applicant: SONY GROUP CORPORATION, Tokyo (JP)

(72) Inventors: Tomoko Katsuhara, Tokyo (JP); Hiroki Kaneko, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 316 days.

(21) Appl. No.: 17/757,947

(22) PCT Filed: Dec. 25, 2020

(86) PCT No.: PCT/JP2020/048874
§ 371 (c)(1),
(2) Date: Jun. 24, 2022

(87) PCT Pub. No.: WO2021/140967
PCT Pub. Date: Jul. 15, 2021

(65) Prior Publication Data
US 2023/0041550 A1  Feb. 9, 2023

(30) Foreign Application Priority Data
Jan. 6, 2020 (JP) .................... 2020-000535

(51) Int. Cl.
*G01L 1/14* (2006.01)
(52) U.S. Cl.
CPC .................... *G01L 1/146* (2013.01)

(58) Field of Classification Search
None
See application file for complete search history.

(56) References Cited

U.S. PATENT DOCUMENTS

| | | | |
|---|---|---|---|
| 3,565,195 A | 2/1971 | Miller et al. | |
| 11,397,499 B2* | 7/2022 | Ebisui | ............... G06F 3/0446 |
| 2020/0187355 A1 | 6/2020 | Kraemer et al. | |

FOREIGN PATENT DOCUMENTS

| | | |
|---|---|---|
| BE | 748978 A | 10/1970 |
| CH | 524137 A | 6/1972 |

(Continued)

OTHER PUBLICATIONS

International Search Report and Written Opinion of PCT Application No. PCT/JP2020/048874, issued on Mar. 23, 2021, 12 pages of ISRWO.

*Primary Examiner* — Peter J Macchiarolo
*Assistant Examiner* — Jermaine L Jenkins
(74) *Attorney, Agent, or Firm* — CHIP LAW GROUP

(57) ABSTRACT

A pressure sensor has a convexly curved surface shape and includes: a capacitive sensor electrode layer including a plurality of sensing parts; a first reference electrode layer having elasticity and facing a first surface of the sensor electrode layer; a second reference electrode layer having elasticity and facing a second surface of the sensor electrode layer; an elastic layer having elasticity and provided between the first reference electrode layer and the sensor electrode layer; and a gap layer having elasticity and provided between the second reference electrode layer and the sensor electrode layer. The sensor electrode layer includes: a curved part; and a plurality of extension parts extending from a concavely curved side of the curved part. The extension parts include the sensing parts.

20 Claims, 20 Drawing Sheets

(56) References Cited

FOREIGN PATENT DOCUMENTS

| | | | |
|---|---|---|---|
| CN | 109690269 A | 4/2019 | |
| CN | 109690273 A | 4/2019 | |
| DE | 2016428 A1 | 10/1970 | |
| EP | 3504725 A1 | 7/2019 | |
| EP | 3514516 A1 | 7/2019 | |
| FR | 2043421 A5 | 2/1971 | |
| GB | 1299279 A | 12/1972 | |
| IE | 33784 B1 | 10/1974 | |
| IL | 34077 A | 5/1973 | |
| JP | 50-019057 B1 | 7/1975 | |
| JP | 2000-159052 A | 6/2000 | |
| JP | 2004-333340 A | 11/2004 | |
| JP | 2007078382 A | 3/2007 | |
| JP | 2007114123 A | 5/2007 | |
| JP | 2014-142193 A | 8/2014 | |
| JP | 2015-114308 A | 6/2015 | |
| JP | 2016180747 A | 10/2016 | |
| JP | 2019119820 A | 7/2019 | |
| JP | 2019211273 A | 12/2019 | |
| NL | 7005249 A | 10/1970 | |
| SE | 367870 B | 6/1974 | |
| SU | 370800 A3 | 2/1973 | |
| WO | WO-2011045835 A | 4/2011 | |
| WO | 2018/037291 A1 | 3/2018 | |
| WO | 2018/051917 A1 | 3/2018 | |
| WO | 2018/052096 A1 | 3/2018 | |
| WO | WO-2018213937 A | 11/2018 | |

\* cited by examiner

CONVEX SURFACE SHAPED ELECTROSTATIC CAPACITANCE TYPE PRESSURE SENSOR USED IN ELECTRONIC DEVICES

CROSS REFERENCE TO RELATED APPLICATIONS

This application is a U.S. National Phase of International Patent Application No. PCT/JP2020/048874 filed on Dec. 25, 2020, which claims priority benefit of Japanese Patent Application No. JP 2020-000535 filed in the Japan Patent Office on Jan. 6, 2020. Each of the above-referenced applications is hereby incorporated herein by reference in its entirety.

TECHNICAL FIELD

The present disclosure relates to a pressure sensor and an electronic device including the pressure sensor.

BACKGROUND ART

In recent years, film-shaped pressure sensors capable of detecting pressure on a surface of a housing of an electronic device have been proposed. For example, Patent Document 1 proposes a pressure sensor including a capacitive sensor electrode layer including a plurality of sensing parts, a first reference electrode layer facing a first surface of the sensor electrode layer, and a second reference electrode layer facing a second surface of the sensor electrode layer.

CITATION LIST

Patent Document

Patent Document 1: WC/2018/052096 pamphlet

SUMMARY OF THE INVENTION

Problems to be Solved by the Invention

Recently, as a film-shaped pressure sensor, a sensor that is mounted on a curved surface part having a convexly curved surface shape and can detect an action of pressure on the curved surface part has been desired. However, it is difficult to mount the pressure sensor described in Patent Document 1 on the curved surface part having a convexly curved surface shape.

An object of the present disclosure is to provide a pressure sensor that can be mounted on the curved surface part having a convexly curved surface shape, and an electronic device including the pressure sensor.

Solutions to Problems

To solve the above-described problem, the first aspect is a pressure sensor having a convexly curved surface shape and including:
a capacitive sensor electrode layer including a plurality of sensing parts;
a first reference electrode layer having elasticity and facing a first surface of the sensor electrode layer;
a second reference electrode layer having elasticity and facing a second surface of the sensor electrode layer;
an elastic layer having elasticity and provided between the first reference electrode layer and the sensor electrode layer; and
a gap layer having elasticity and provided between the second reference electrode layer and the sensor electrode layer, in which
the sensor electrode layer includes:
a curved part; and
a plurality of extension parts extending from a concavely curved side of the curved part, and
the extension parts include the sensing parts.

The second aspect is a pressure sensor including:
a capacitive sensor electrode layer including a plurality of sensing parts;
a first reference electrode layer facing a first surface of the sensor electrode layer;
a second reference electrode layer having elasticity and facing a second surface of the sensor electrode layer;
an elastic layer provided between the first reference electrode layer and the sensor electrode layer; and
a gap layer provided between the second reference electrode layer and the sensor electrode layer, in which
the sensor electrode layer includes:
a plurality of island parts arranged in a matrix; and
a plurality of bridge parts having an elastic configuration and coupling the adjacent island parts, and
the island parts include the sensing parts.

The third aspect is an electronic device including:
an exterior body including a curved surface part having a convexly curved surface shape; and
the pressure sensor according to the first aspect or the second aspect provided on the curved surface part.

MODE FOR CARRYING OUT THE INVENTION

Embodiments of the present disclosure will be described in the following order. Note that in all the drawings of the following embodiments, the same or corresponding parts are denoted with the same reference symbols.
1. First embodiment (example of sensor and electronic device including the sensor)
2. Second embodiment (example of sensor)
3. Application example 1. First Embodiment

[Configuration of Electronic Device]

Figure 1:
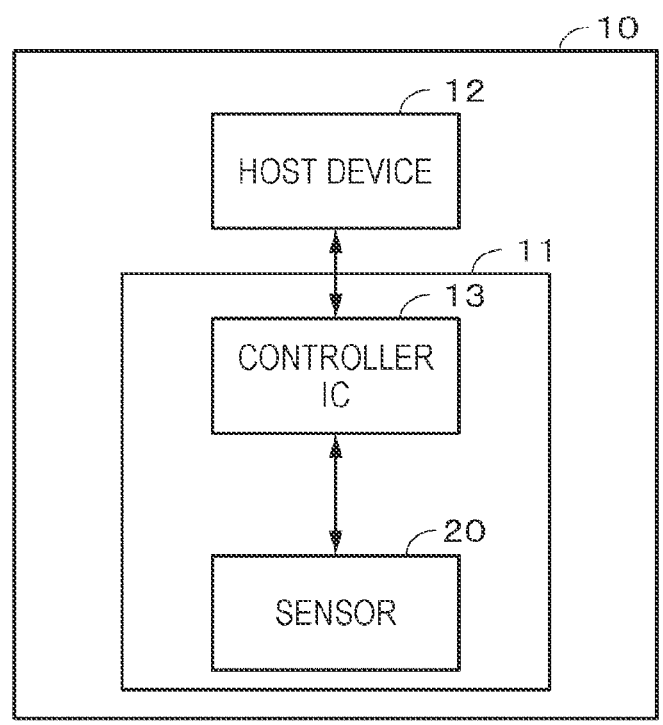
FIG. 1 is a block diagram showing a configuration of an electronic device according to a first embodiment of the present disclosure.

FIG. 1 is a block diagram showing a configuration of an electronic device 10 according to a first embodiment of the present disclosure. The electronic device 10 includes a sensor module 11 and a host device 12, which is a body of the electronic device 10. The electronic device 10 has a curved surface part having a convexly curved surface shape, detects pressure acting on this curved surface part with the sensor module 11, and operates according to detection results.

(Sensor Module)

The sensor module 11 includes a sensor 20 and a controller IC 13 as a control unit. The sensor 20 detects a change in capacitance according to the pressure (pressure distribution) acting on the curved surface part, and outputs an output signal according to the change to the controller IC 13. The controller IC 13 controls the sensor 20, acquires the pressure (pressure distribution) acting on the sensor 20 on the basis of the output signal output from the sensor 20, and outputs the pressure to the host device 12.

(Sensor)

Figure 2:
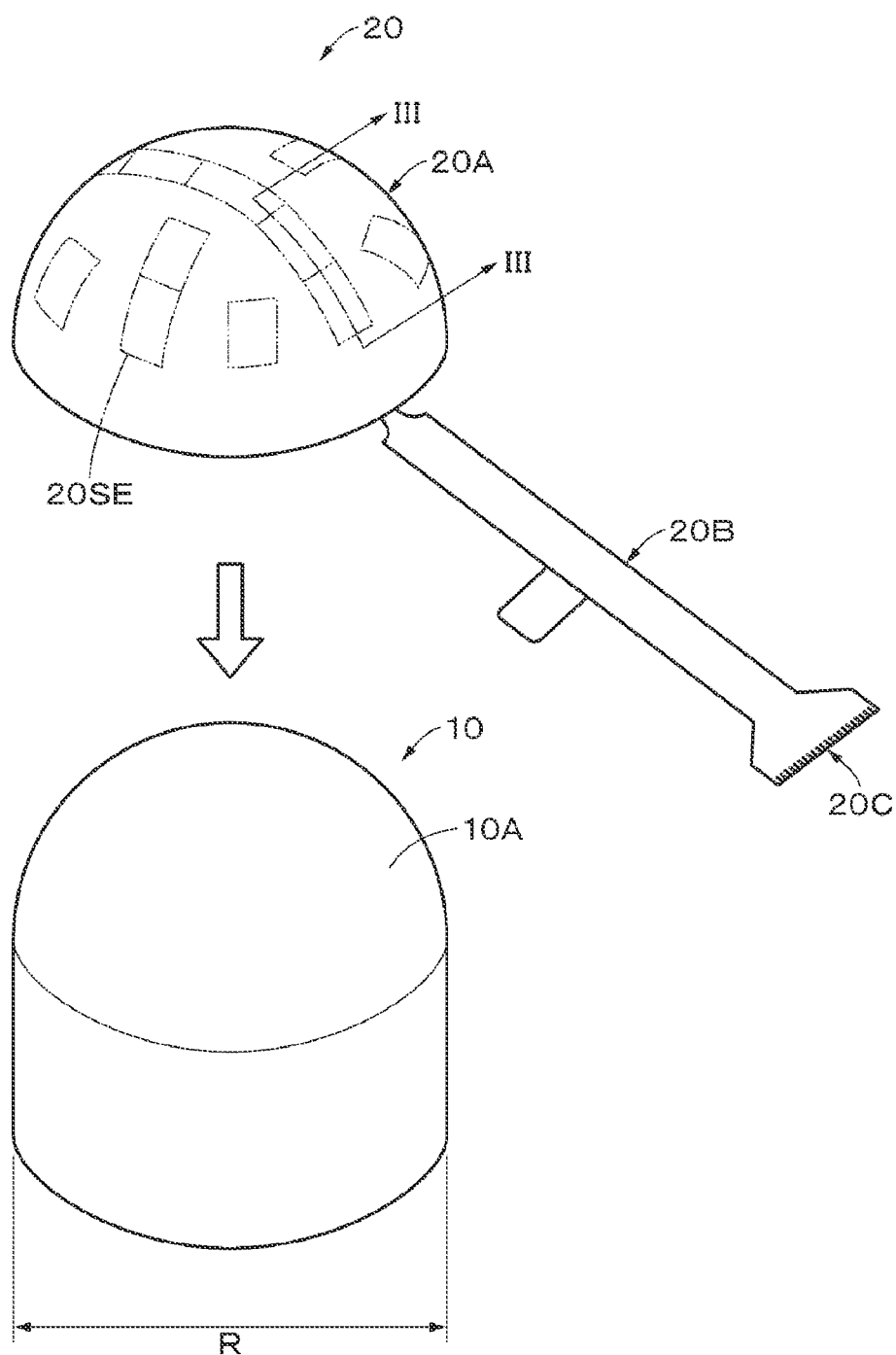
FIG. 2 is a perspective view of a sensor according to the first embodiment of the present disclosure.

FIG. 2 is a perspective view of the sensor 20. The sensor 20 is a capacitive pressure sensor having a film shape. In the present disclosure, it is defined that the film includes a sheet. The sensor 20 includes a sensor body 20A and a connection part 20B. The connection part 20B is provided as needed and may not be provided. A curved surface part 10A is, for example, part of an exterior body of the electronic device 10. The exterior body may be a housing and the like. The sensor 20 can be applied to the electronic device 10 such as a robot and the like or a UI device that implements natural user interface (NUI).

The sensor body 20A has a convexly curved surface shape similar to the curved surface part 10A. The sensor body 20A is provided on the curved surface part 10A such that the sensor body 20A and the top of the curved surface part 10A agree with each other. The sensor body 20A and the curved surface part 10A may be pasted together with an adhesive layer. The sensor body 20A detects the pressure (pressure distribution) acting on the curved surface part 10A on the basis of control of the controller IC 13, and outputs detection results to the controller IC 13. The convexly curved surface shape possessed by the sensor body 20A and the curved surface part 10A is a spherical shape. Here, it is assumed that the spherical shape includes a substantial spherical shape.

The sensor body 20A includes a plurality of sensing parts 20SE. The plurality of sensing parts 20SE detects the pressure acting on the curved surface part 10A on the basis of the change in capacitance. The plurality of sensing parts 20SE is arranged radially around the top of the sensor body 20A. The sensing parts 20SE each have, for example, a square shape. However, the shape of the sensing part 20SE is not limited to a square shape, and may be a circular shape, an elliptical shape, a polygonal shape other than a square shape, or the like. One of the plurality of sensing parts 20SE is located at the top of the sensor 20 having a convexly curved surface shape. With this arrangement, it is possible to improve detection sensitivity of the pressure acting on the top of the curved surface part 10A.

Figure 3:
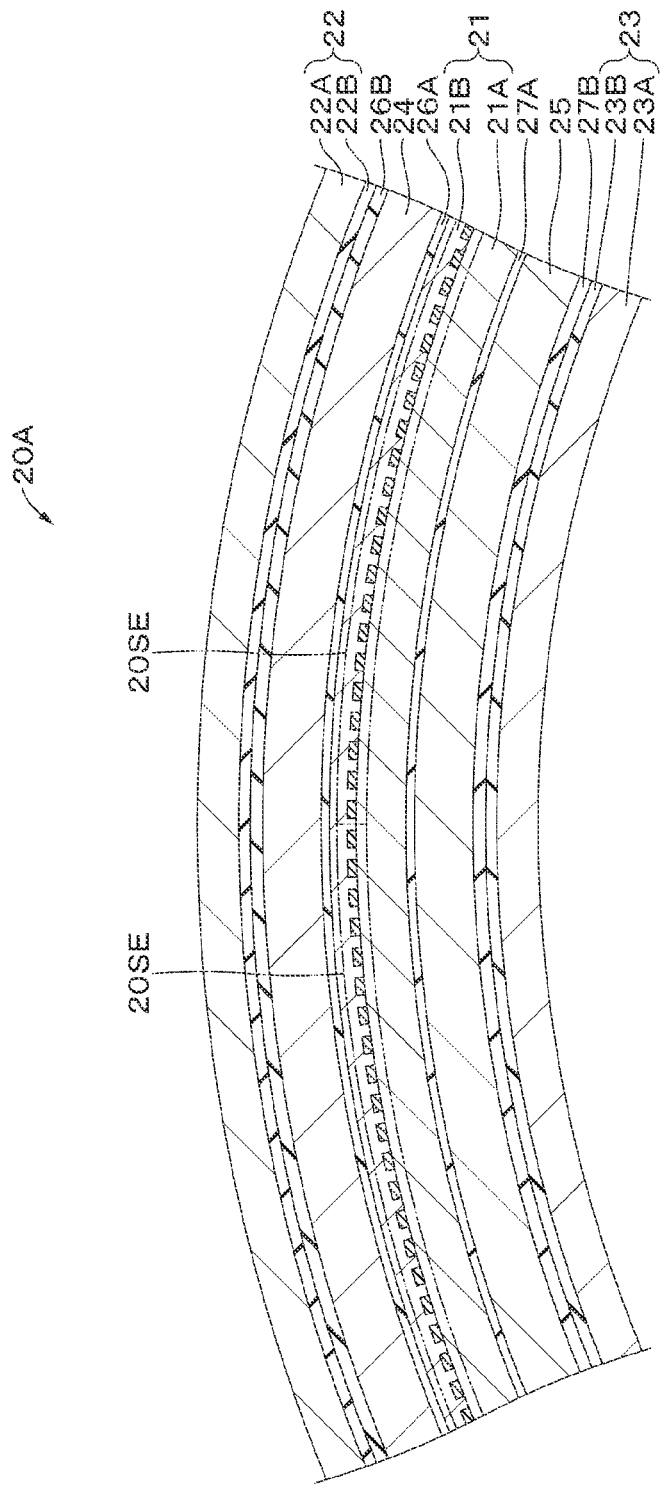
FIG. 3 is a cross-sectional view showing a configuration of a sensor body.

FIG. 3 is a cross-sectional view showing a configuration of the sensor body 20A. The sensor body 20A includes a capacitive sensor electrode layer 21, electrode base materials 22 and 23, an elastic layer 24, a gap layer 25, and adhesive layers 26A, 26B, 27A, and 27B. The surface on the electrode base material 23 side of the sensor body 20A may be pasted on the curved surface part 10A via the adhesive layer (not shown). Respective layers constituting the sensor body 20A are preferably integrated as a whole.

The electrode base material 22 is provided to face a first surface of the sensor electrode layer 21. The elastic layer 24 is provided between the sensor electrode layer 21 and the electrode base material 22. The sensor electrode layer 21 and the elastic layer 24 are pasted together with the adhesive layer 26A, and the electrode base material 22 and the elastic layer 24 are pasted together with the adhesive layer 26B. Note that the adhesive layers 26A and 26B are provided as needed, and may not be provided in a case where the elastic layer 24 has adhesiveness, for example.

The electrode base material 23 is provided to face a second surface of the sensor electrode layer 21. The gap layer 25 is provided between the sensor electrode layer 21 and the electrode base material 23. The sensor electrode layer 21 and the gap layer 25 are pasted together with the adhesive layer 27A, and the electrode base material 23 and the gap layer 25 are pasted together with the adhesive layer 27B. Note that the adhesive layers 27A and 27B are provided as needed, and may not be provided in a case where the gap layer 25 has adhesiveness, for example.

(Sensor Electrode Layer)

Figure 4:
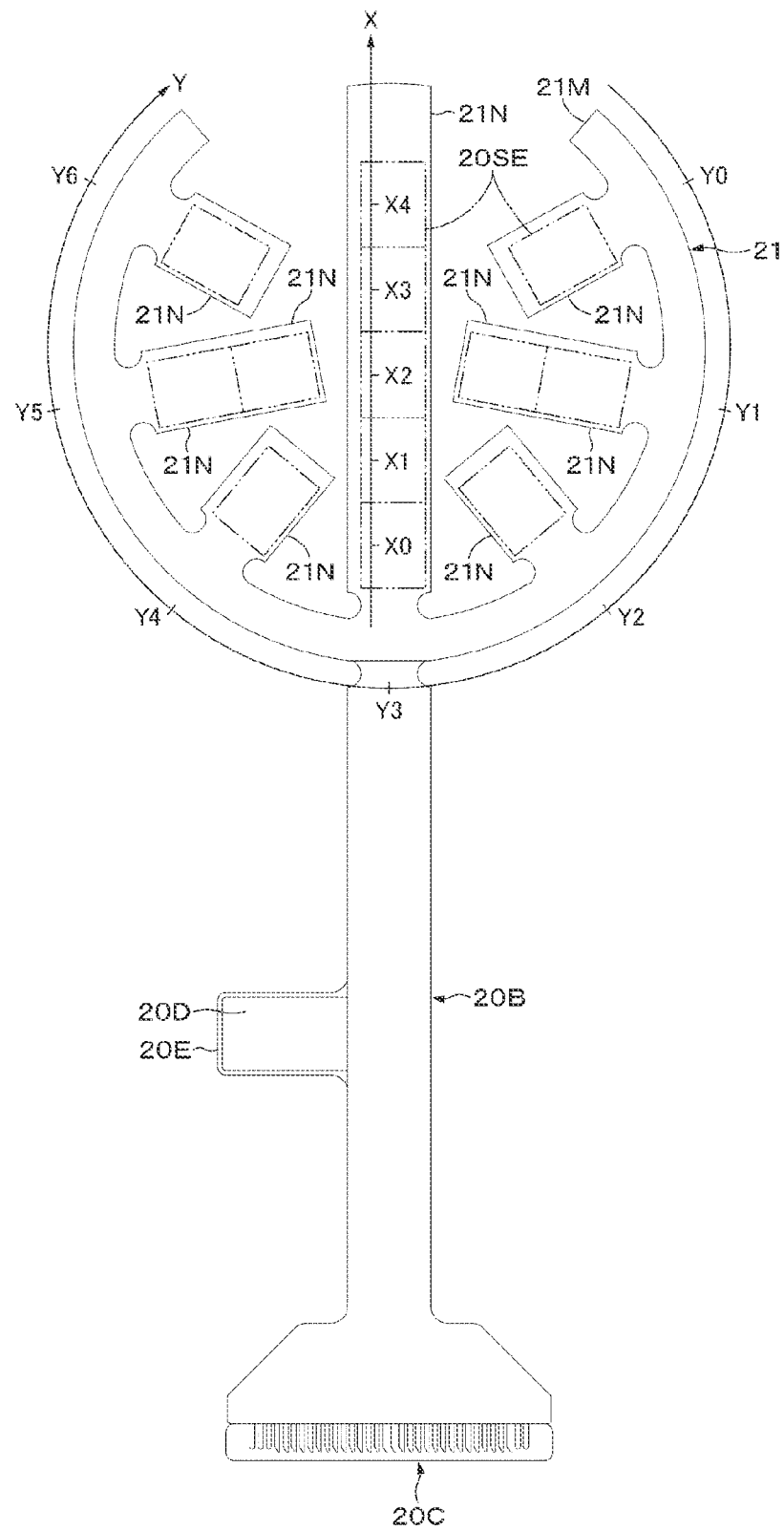
FIG. 4 is a plan view showing a configuration of a sensor electrode layer and a connection part in a planar state.

FIG. 4 is a plan view showing the configuration of the sensor electrode layer 21 in a planar state. The sensor electrode layer 21 includes the plurality of sensing parts 20SE. The sensor electrode layer 21 includes a curved part 21M and a plurality of extension parts 21N.

The curved part 21M has an arc shape. Here, it is assumed that the arc shape includes a substantia arc shape. The plurality of extension parts 21N extends from the periphery on the concavely curved side of the curved part 21M toward the center of the curved part 21M. Furthermore, the plurality of extension parts 21N is provided at equal intervals or non-equal intervals in the periphery on the concavely curved side of the curved part 21M. FIG. 4 shows an example in which the plurality of extension parts 21N is provided at equal intervals in the periphery on the concavely curved side of the curved part 21M. The longest extension part 21N of the plurality of extension parts 21N extends from the center of the periphery on the concavely curved side of the curved part 21M. The longest extension part 21N of the plurality of extension parts 21N includes the sensing part 20SE located at the top of a convexly curved surface shape of the sensor body 20A and straddling the top of the sensor body 20A having a convexly curved surface shape.

The plurality of extension parts 21N each includes one or more sensing parts 20SE. FIG. 4 shows an example in which the sensor electrode layer 21 includes four extension parts 21N each including one sensing part 20SE, two extension parts 21N each including two sensing parts 20SE, and one extension part 21N including five sensing parts 20SE. The sensing part 20SE detects capacitance according to the distance between the sensing part 20SE and the electrode base material 22.

In the extension part 21N including the plurality of sensing parts 20SE, the plurality of sensing parts 20SE is disposed in an extension direction of the extension part 21N, that is, from the curved part 21M toward the center of the curved part 21M, and constitutes one or more lines. FIG. 4 shows an example in which the plurality of sensing parts 20SE included in the extension part 21N forms one line.

Figure 5:
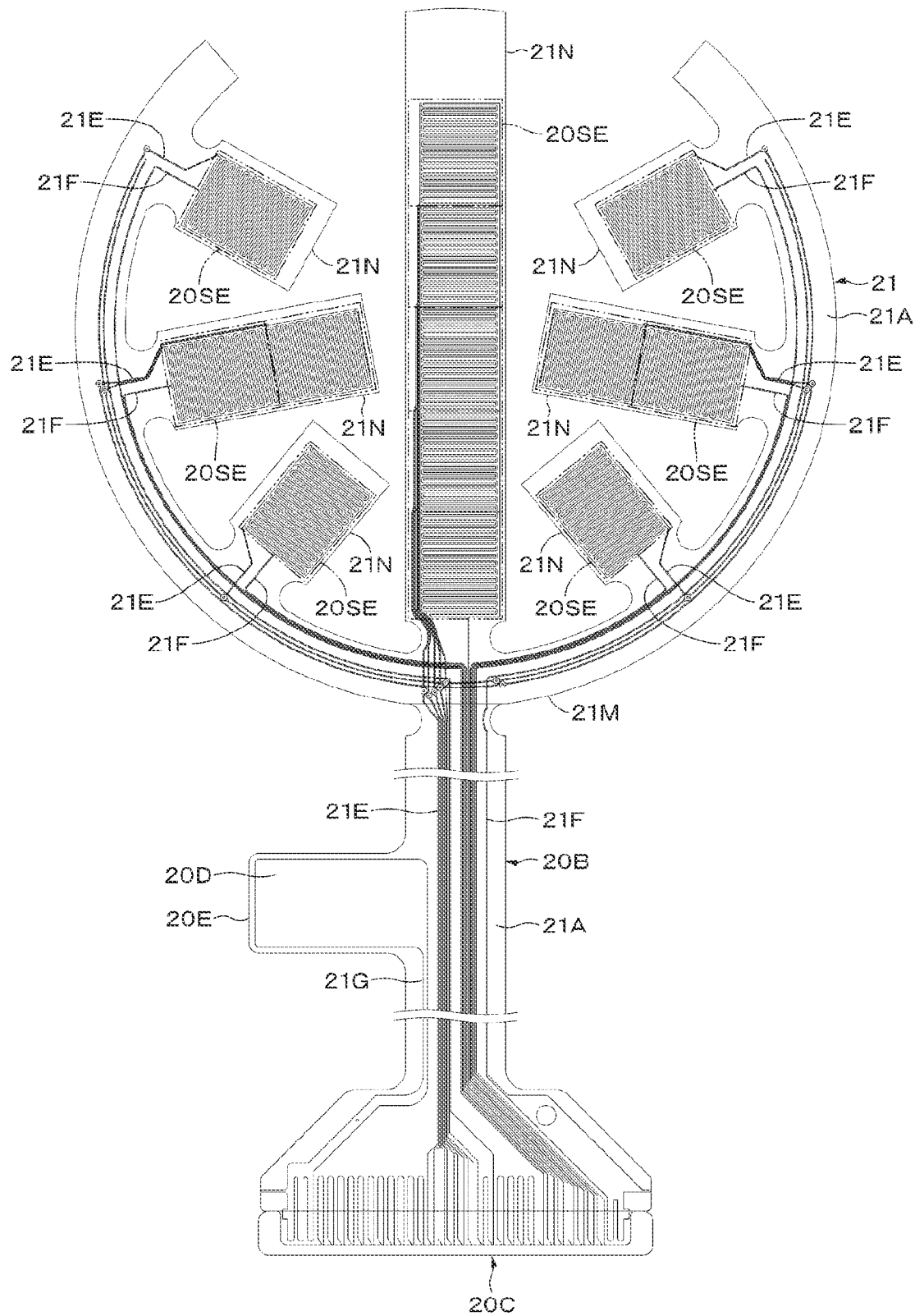
FIG. 5 is a plan view showing a configuration of electrodes and wires of the sensor electrode layer, and a configuration of wires of the connection part.
Figure 6:
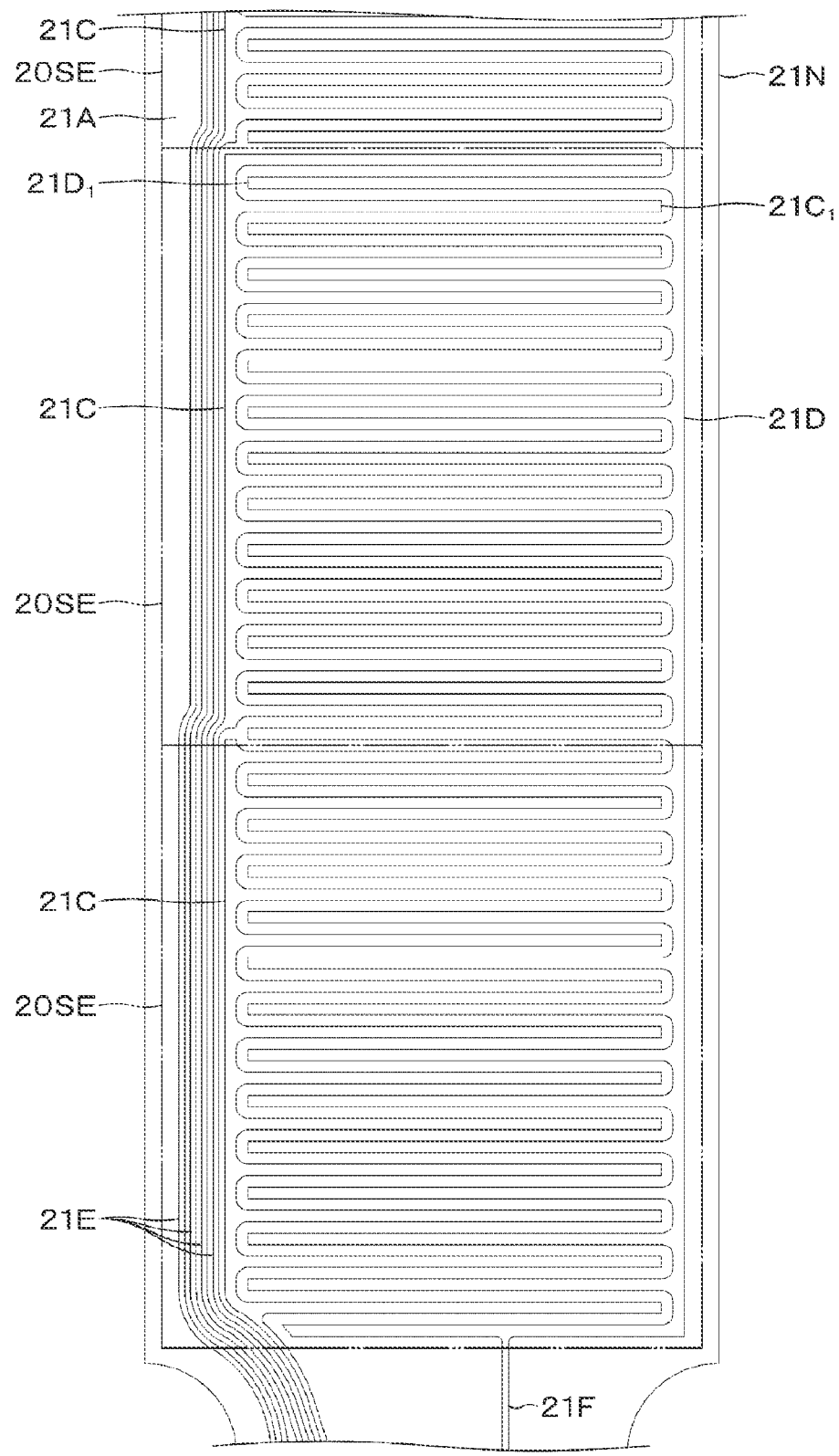
FIG. 6 is an enlarged plan view showing a configuration of a sensing part.

FIG. 5 is a plan view showing the configuration of the sensor electrode layer 21. FIG. 6 is an enlarged plan view of the extension part 21N. Note that FIGS. 5 and 6 show the sensor electrode layer 21 and the extension part 21N in a state where a protective layer 21B is not provided. The sensor electrode layer 21 includes a base material 21A, the plurality of sensing parts 20SE, the protective layer 21B (see FIG. 3), a plurality of wires 21E, and a plurality of wires 21F. The sensor electrode layer 21 has non-elasticity in the in-plane direction of the sensor 20.

The base material 21A is a film having flexibility. The base material 21A contains a high polymer resin and has flexibility. Examples of high polymer resin include, but are not limited to, polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyethersulfone, polysulfone, polypropylene (PP), cellulose diacetate, polyvinyl chloride, epoxy resin, urea resin, urethane resin, melamine resin, cyclic olefin polymer (COP), norbornene-based thermoplastic resin, or the like.

The sensing parts 20SE are provided on one surface of the base material 21A. The sensing parts 20SE each include a pulse electrode (first electrode) 21C and a sense electrode (second electrode) 21D. The pulse electrode 21C and the sense electrode 21D can form capacitive coupling. The pulse electrode 21C and the sense electrode 21D have a comb-like shape and are arranged such that the comb-like parts mesh with each other. The sensing part 20SE includes the pulse electrode 21C and the sense electrode 21D arranged in this way.

More specifically, the pulse electrode 21C includes a plurality of sub-electrodes (first sub-electrodes) $21C_1$ having a linear shape. The sense electrode 21D includes a plurality of sub-electrodes (second sub-electrodes) $21D_1$ having a linear shape. The plurality of sub-electrodes $21C_1$ and $21D_1$ is alternately arranged at certain intervals. The sensing part 20SE includes the plurality of sub-electrodes $21C_1$ and $21D_1$ arranged alternately in this way.

The sensing part 20SE detects pressure (capacitance) by using the leakage electric field between the pulse electrode 21C and the sense electrode 21D. Therefore, if the distance between the pulse electrode 21C and the sense electrode 21D changes, the pressure sensitivity changes and the reliability decreases. Therefore, the base material 21A of the sensor electrode layer 21 includes a non-elasticity material from the viewpoint of suppressing the decrease in reliability.

The curved part 21M includes the plurality of wires 21E and the plurality of wires 21F. The plurality of wires 21E and the plurality of wires 21F are each connected to the plurality of sensing parts 20SE. The wires 21E are drawn out from the pulse electrode 21C and then drawn from the curved part 21M to the connection part 20B. The wires 21F are drawn out from the sense electrode 21D and then drawn from the curved part 21M to the connection part 20B.

The protective layer 21B covers one surface of the base material 21A on which the sensing parts 20SE are provided. The protective layer 21B is intended to protect the sensing parts 20SE. The protective layer 21B is, for example, an insulating film such as a cover lay film and the like, or an insulating resist material. Note that the sensor 20 may not include the protective layer 21B and the adhesive layer 26A may be provided directly on one surface of the base material 21A on which the sensing parts 20SE are provided.

The sensor electrode layer 21 and the connection part 20B are integrally configured using one base material 21A. The sensor electrode layer 21 and the connection part 20B may be integrally configured using one flexible printed circuits (hereinafter referred to as "FPC"). By integrally configuring the sensor electrode layer 21 and the connection part 20B in this way, the number of parts of the sensor 20 can be reduced. Furthermore, impact durability of the connection between the sensor 20 and the circuit board (not shown) can be improved.

(Electrode Base Material)

The electrode base materials 22 and 23 are electrode films having flexibility. The electrode base materials 22 and 23 have elasticity in the in-plane direction of the sensor 20. However, it is preferable to select a material having resistance that does not exceed 10Ω/□ even in a state where the electrode base materials 22 and 23 are extended in the in-plane direction. The electrode base materials 22 and 23 have a convexly curved surface shape, such as a spherical shape and the like.

The electrode base material 22 includes a base material 22A having flexibility and a reference electrode layer (hereinafter referred to as "REF electrode layer") 22B provided on one surface of the base material 22A. The electrode base material 22 is provided on one surface side of the sensor electrode layer 21 with the REF electrode layer 22B facing one surface of the sensor electrode layer 21. The electrode base material 23 includes a base material 23A having flexibility and a REF electrode layer 23B provided on one surface of the base material 23A. The electrode base material 23 is provided on the other surface side of the sensor electrode layer 21 with the REF electrode layer 23B facing the other surface of the sensor electrode layer 21. The electrode base material 23 may be an exterior body of the electronic device 10 (for example, housing) and the like.

The base materials 22A and 23A have a film shape. The base materials 22A and 23A have elasticity in the in-plane direction of the sensor 20. As the material of the base materials 22A and 23A, foamed resin, elastomer, or the like can be used.

The REF electrode layers 22B and 23B are so-called ground electrodes and have ground potential. The REF electrode layers 22B and 23B have elasticity in the in-plane direction of the sensor 20. Examples of the shape of the REF electrode layers 22B and 23B include, but are not limited to, the shape of thin film, foil, mesh, and the like.

The REF electrode layers 22B and 23B contains a conductive material. Examples of the conductive material include at least one type of conductive filler and conductive polymer. Examples of the shape of the conductive filler include, but are not limited to, spherical, ellipsoidal, needle-shape, plate-shape, scaly, tubular, wire-shape, cylindrical (rod-shape), fibrous, indefinite shape, and the like. Note that only one type of shape of conductive filler may be used, or two or more types of shape of conductive filler may be used in combination. The REF electrode layers 22B and 23B may be conductive cloth.

Examples of the conductive filler includes at least one type of carbon-based filler, metal-based filler, metal oxide-based filler, and metal coating-based filler. Here, the metal is defined to include semimetal.

Examples of the carbon-based filler include at least one type of carbon black (for example, Ketjen black, acetylene black, and the like), porous carbon, carbon fiber (for example, PAN-based, pitch-based, and the like), carbon nanofiber, fullerenes, graphene, vapor-growth carbon fiber (VGCF), carbon nanotube (for example, SWCNT, MWCNT, and the like), carbon microcoils, and carbon nanohorn.

Examples of the metal-based filler include at least one type of copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead.

Examples of the metal oxide-based filler include indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide, indium oxide-tin oxide, or zinc oxide-indium oxide-magnesium oxide.

The metal coating-based filler is a base filler coated with metal. The base filler is, for example, mica, glass beads, glass fiber, carbon fiber, calcium carbonate, zinc oxide, or titanium oxide. Examples of the metal that coats the base filler include at least one type of Ni and Al.

Examples of the conductive polymer include at least one type of polyethylene dioxythiophene/polystyrene sulfonic acid (PEDOT/PSS), polyaniline, polyacetylene, and polypyrrole.

The REF electrode layers 22B and 23B may further contain a binder if necessary. The binder has elasticity. The binder is preferably an elastomer.

Since the electrode base materials 22 and 23 are provided on both surface sides of the sensor electrode layer 21, it is possible to suppress external noise (external electric field) from entering the sensor electrode layer 21 from both surface sides of the sensor 20. Therefore, it is possible to suppress a decrease in detection accuracy or erroneous detection of the sensor 20 due to the external noise.

(Elastic Layer)

The elastic layer 24 is elastically deformable by the pressure applied to the surface on the electrode base material 22 side of the sensor 20. By sandwiching the elastic layer 24 between the sensor electrode layer 21 and the electrode base material 22, sensitivity and dynamic range of the sensor 20 can be adjusted. The elastic layer 24 may be provided on a support body as needed. As the material of the support body, for example, an elastomer and the like can be used. The elastic layer 24 has elasticity in the in-plane direction of the sensor 20. The elastic layer 24 has a convexly curved surface shape such as a spherical shape and the like.

The elastic layer 24 contains foamed resin, elastomer, or the like. The foamed resin is a so-called sponge, and is, for example, at least one type of foamed polyurethane (polyurethane foam), foamed polyethylene (polyethylene foam), foamed polyolefin (polyolefin foam), foamed acrylic (acrylic foam), sponge rubber, and the like. The elastomer is, for example, at least one type of a silicone-based elastomer, an acrylic-based elastomer, a urethane-based elastomer, a styrene-based elastomer, and the like.

(Gap Layer)

The gap layer 25 is insulating and separates the electrode base material 23 from the sensor electrode layer 21. The initial capacitance of the sensor 20 is adjusted using the thickness of the gap layer 25. The gap layer 25 may be elastically deformable by the pressure applied to the surface on the electrode base material 22 side of the sensor 20, or may not be elastically deformable. In a case where the gap layer 25 is elastically deformable, the gap layer 25 may contain foamed resin, elastomer, or the like. The gap layer 25 has elasticity in the in-plane direction of the sensor 20. The gap layer 25 has a convexly curved surface shape such as a spherical shape and the like.

The gap layer 25 may or may not have adhesiveness. In a case where the gap layer 25 has adhesiveness, the electrode base material 23 and the sensor electrode layer 21 are pasted together with the gap layer 25. The gap layer 25 having adhesiveness includes, for example, a single layer adhesive layer or a laminate in which adhesive layers are provided on both sides of the base material (for example, double-sided adhesive film). The adhesive layer may have elasticity in the in-plane direction of the sensor 20.

As the adhesive contained in the adhesive layer described above, for example, at least one type of acrylic-based adhesive, silicone-based adhesive, and urethane-based adhesive can be used. Note that in the present disclosure, pressure sensitive adhesion is defined as one type of adhesion. According to this definition, a pressure sensitive adhesive layer is considered one type of adhesive layer.

(Adhesive Layer)

The adhesive layers 26A, 26B, 27A, and 27B include, for example, an insulating adhesive or a double-sided adhesive film. As the adhesive, an adhesive similar to the adhesive of the gap layer 25 described above can be exemplified. The adhesive layers 26A, 26B, 27A, and 27B may have elasticity in the in-plane direction of the sensor 20.

(Connection Part)

The connection part 20B is connected to a circuit board (not shown) including the controller IC13. The controller IC13 may be provided on the connection part 20B. The connection part 20B extends from part of the periphery of the sensor body 20A. More specifically, the connection part 20B extends from the center of the periphery on the convexly curved side of the curved part 21M. The longest extension part 21N and the connection part 20B may be provided in a linear shape. The connection part 20B includes a ground electrode 20D, the base material 21A, a connection terminal 20C, the plurality of wires 21E, the plurality of wires 21F, a wire 21G, and the protective layer 21B.

The connection terminal 20C, the ground electrode 20D, the plurality of wires 21E, the plurality of wires 21F, and the wire 21G are provided on the base material 21A. The connection terminal 20C is provided at the tip of the base material 21A. The connection terminal 20C is connected to a connection terminal (not shown) of the circuit board described above.

The base material 21A includes a protrusion 20E protruding from the long side of the connection part 20B. The ground electrode 20D is provided on the protrusion 20E. The wires 21E connect the pulse electrode 21C to the connection terminal 20C. The wires 21F connect the sense electrode 21D to the connection terminal 20C. The wire 21G connects the ground electrode 20D to the connection terminal 20C.

[Method for Pasting Sensor]

Examples of the method for mounting the sensor 20 having the above configuration on the curved surface part 10A include: a method for pasting all layers of the sensor 20 on a flat surface in advance and then pasting the sensor on the curved surface part 10A; a method for pasting each of the layers constituting the sensor 20 on the curved surface part 10A one by one; and a method for pasting the plurality of layers constituting the sensor 20 on the curved surface part 10A in two or more batches. To reduce the manufacturing cost and manufacturing time of the electronic device 10 including the sensor 20, it is preferable to reduce the number of times of pasting. However, in a case where all the layers of the sensor 20 are pasted together at one time, there is a possibility that more tension is applied to the higher-layer film, the elastic layer 24 is crushed, and the sensitivity decreases. Therefore, from the viewpoint of suppressing the decrease in sensitivity of the sensor 20, it is preferable to paste the layers at least separately at the interface between the elastic layer 24 and the electrode base material 22.

Examples of the pasting method on the curved surface part 10A include a method for pasting the layers by using a roller corresponding to the curved surface part 10A, and a method for pasting the layers by using an airbag, diaphragm including a rubber sheet, or the like. In particular, the vacuum pasting method using a transfer sheet, which is used in the decoration technique, is preferable.

When pasting the layers, the electrode base materials 22 and 23, the elastic layer 24, and the gap layer 25 may have a circular shape, or may have a rectangular shape and the like other than the circular shape. In a case where the electrode base materials 22 and 23, the elastic layer 24, and the gap layer 25 have a rectangular shape and the like, the electrode base materials 22 and 23, the elastic layer 24, and the gap layer 25 may be pasted on the curved surface part 10A and then cut to fit the shape of the curved surface part 10A.

[Operation of Sensor]

If pressure acts on the surface of the sensor 20 mounted on the curved surface part 10A, the electrode base material 22 bends toward the sensor electrode layer 21 around the place where the pressure acts, and crushes part of the elastic layer 24. With this arrangement, part of the REF electrode layer 22B and part of the sensor electrode layer 21 come close to each other. As a result, part of the electric lines of force of one or more sensing parts 20SE included in the part of the sensor electrode layer 21 that is close to the REF electrode layer 22B (that is, part of the electric lines of force between the pulse electrode 21C and the sense electrode 21D) flows through the REF electrode layer 22B, and the capacitance of one or more sensing parts 20SE changes.

In a case where the gap layer 25 is elastically deformable by the pressure applied to the surface on the electrode base material 22 side of the sensor 20, the capacitance of one or more sensing parts 20SE changes further as follows. That is, if pressure acts on the surface on the electrode base material 22 side of the sensor electrode layer 21 by part of the elastic layer 24 crushed as described above, the sensor electrode layer 21 bends toward the electrode base material 23 around the place on which the pressure acts, and crushes part of the gap layer 25. With this arrangement, part of the sensor electrode layer 21 and part of the electrode base material 23 come close to each other. As a result, part of the electric lines of force of one or more sensing parts 20SE included in the part of the sensor electrode layer 21 that is close to the REF electrode layer 23B (that is, part of the electric lines of force between the pulse electrode 21C and the sense electrode 21D) further flows through the REF electrode layer 23B.

The controller IC 13 sequentially scans the plurality of sensing parts 20SE included in the sensor electrode layer 21, acquires output signal distribution, that is, the capacitance distribution, from the plurality of sensing parts 20SE, and outputs the acquired output signal distribution to the host device 12.

Advantageous Effects

As described above, in the sensor 20 according to the first embodiment, the REF electrode layers 22B and 23B, the elastic layer 24, and the gap layer 25 have elasticity. Furthermore, the sensor electrode layer 21 includes the curved part 21M and the plurality of extension parts 21N extending from the periphery on the concavely curved side of the curved part 21M. With this arrangement, the sensor 20 can be mounted on the curved surface part 10A having a convexly curved surface shape while being extended. Therefore, the sensor 20 can be mounted on the curved surface part 10A having a convexly curved surface shape while suppressing the occurrence of wrinkles. Furthermore, by suppressing the occurrence of wrinkles, it is possible to suppress the occurrence of uneven sensitivity, blind region, and the like of the sensor 20.

Furthermore, since the sensor electrode layer 21, that is, the base material 21A has non-elasticity, when pasting the sensor electrode layer 21 on the curved surface part 10A, it is possible to suppress the change in the distance between the sub-electrodes $21C_1$ of the pulse electrode 21C and the sub-electrodes $21D_1$ of the sense electrode 21D. Therefore, it is possible to suppress the change in the pressure sensitivity of the sensing parts 20SE before and after the sensor 20 is mounted on the curved surface part 10A having a convexly curved surface shape.

Furthermore, the sensor 20 can be mounted on the curved surface part 10A after all the layers of the sensor 20 are pasted in advance. Alternatively, by pasting respective layers constituting the sensor 20 one by one or two or more layers together on the curved surface part 10A, the sensor 20 can be mounted on the curved surface part 10A. With this arrangement, mountability of the sensor 20 on the curved surface part 10A having a convexly curved surface shape can be improved. Furthermore, the sensor 20 can be mounted on the curved surface part 10A having various diameters.

Furthermore, since respective layers constituting the sensor 20 are integrated into one layer as a whole, the sensor 20 has few edge portions, and it is possible to suppress peeling from the end, deterioration, and the like. Therefore, durability of the sensor 20 can be improved.

MODIFICATIONS

First Modification

The above-described first embodiment has described the case where the convexly curved surface shape of the sensor body 20A and the curved surface part 10A is a spherical shape. However, the convexly curved surface shape of the sensor body 20A and the curved surface part 10A may be an aspherical shape. The aspherical shape is, for example, an ellipsoidal shape, parabolic shape, hyperboloidal shape, or the like. Here, it is assumed that the ellipsoidal shape, the parabolic shape, and the hyperboloidal shape include a substantially ellipsoidal shape, a substantially parabolic shape, and a substantially hyperboloidal shape, respectively.

Second Modification

The above-described first embodiment has described the case where the electronic device 10 includes the curved surface part 10A having a convexly curved surface shape and the sensor 20 is provided on the curved surface part 10A. However, the electronic device 10 may include a curved surface part 10A having a concavely curved surface shape, and the sensor 20 may be provided on the curved surface part 10A.

In this case, the stacking order of respective layers of the sensor 20 is preferably opposite to the stacking order of the first embodiment. That is, it is preferable that respective layers of the sensor 20 are stacked from the concave surface side to the convex surface side of the sensor 20 in the order of the electrode base material 22, the adhesive layer 26B, the elastic layer 24, the adhesive layer 26A, the sensor electrode layer 21, the adhesive layer 27A, the gap layer 25, the adhesive layer 27B, and the electrode base material 23.

Third Modification

The electrode base materials 22 and 23 may have one or more slits. With this arrangement, it is easier to extend the electrode base materials 22 and 23 in the in-plane direction of the sensor 20, and therefore mountability of the sensor 20 on the curved surface part 10A having a convexly curved surface shape can be further improved.

Figure 9:
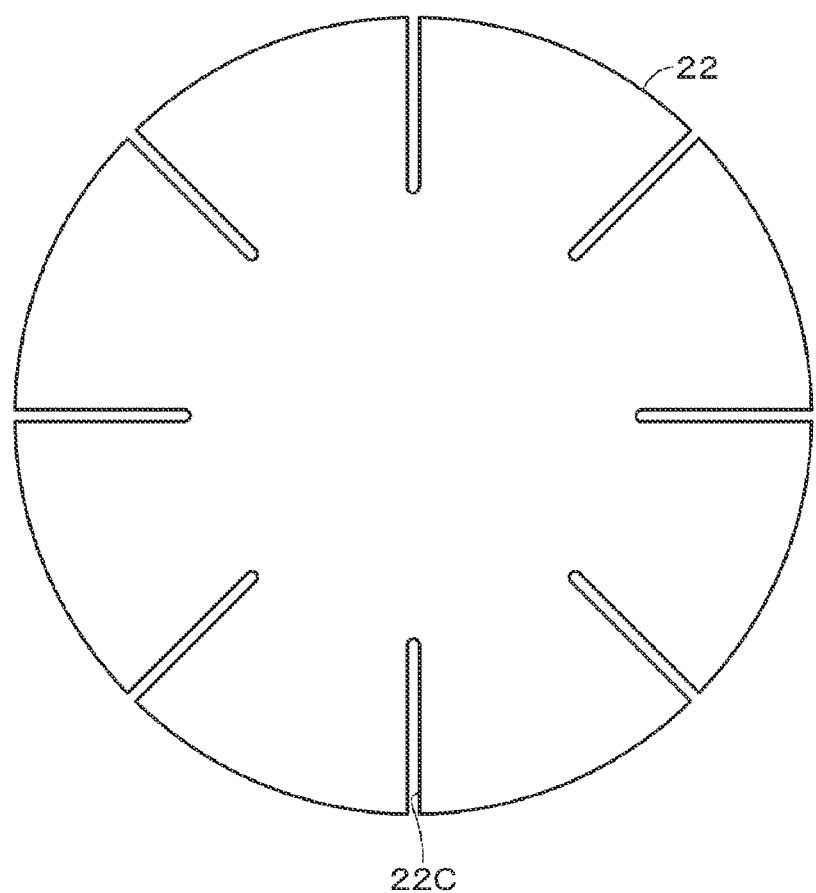
FIG. 9 is a plan view showing one example of a shape of slits of an electrode base material.

FIG. 9 is a plan view showing one example of a shape of slits 22C of the electrode base material 22. The slits 22C extend from the periphery of the electrode base material 22 toward the center. The plurality of slits 22C may extend radially from the center of the electrode base material 22. FIG. 9 shows an example in which the electrode base material 22 includes the plurality of slits, but the electrode base material 22 may include one slit.

The shape of one or more slits included in the electrode base material 23 can be similar to the shape of one or more slits 22C included in the electrode base material 22 (see FIG. 9).

The elastic layer 24 may include one or more slits. With this arrangement, it is easier to extend the elastic layer 24 in the in-plane direction of the sensor 20, and therefore mountability of the sensor 20 on the curved surface part 10A having a convexly curved surface shape can be further improved.

The shape of one or more slits included in the elastic layer 24 can be similar to the shape of one or more slits 22C included in the electrode base material 22 (see FIG. 9).

The gap layer 25 may include one or more slits. With this arrangement, it is easier to extend the gap layer 25 in the in-plane direction of the sensor 20, and therefore mountability of the sensor 20 on the curved surface part 10A having a convexly curved surface shape can be further improved.

The shape of one or more slits included in the gap layer 25 can be similar to the shape of one or more slits 22C included in the electrode base material 22 (see FIG. 9).

It is preferable to change at least one of the slit position, the slit frequency, and the like included in each layer constituting the sensor body 20A. With this arrangement, the sensor body 20A can be given a sense of unity. Furthermore, it is possible to improve the ease of mounting and the durability against peeling and the like.

Fourth Modification

Figure 7:
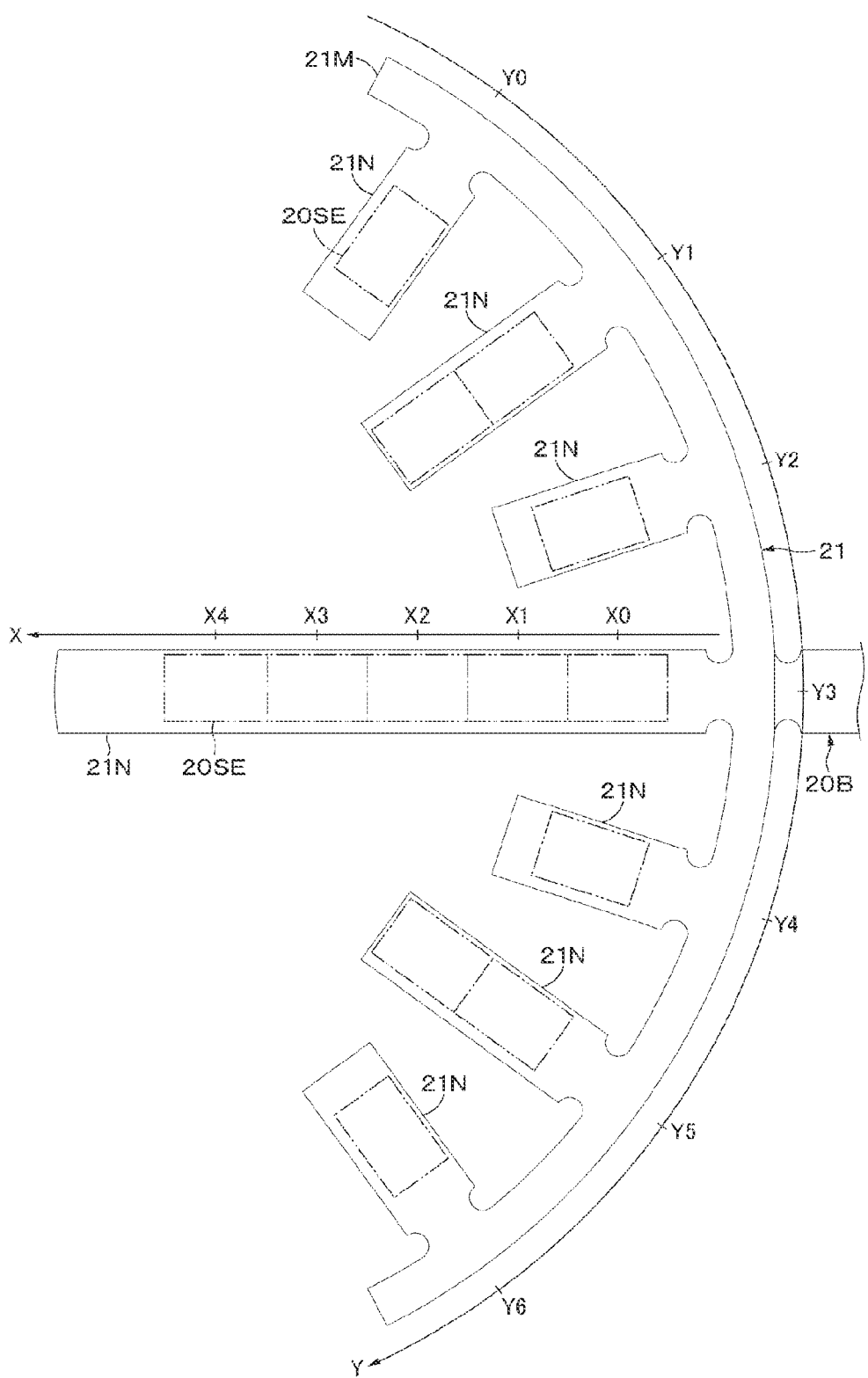
FIG. 7 is a plan view showing the configuration of the sensor electrode layer in a planar state.

The length of the curved part 21M in the sensor electrode layer 21 of a planar state is preferably adjusted according to the curvature, size, and the like of the curved surface part 10A where the sensor 20 is provided. The length of the curved part 21M in the sensor electrode layer 21 of a planar state may be equal to or longer than half circumference as shown in FIG. 4, or may be less than half circumference, as shown in FIG. 7.

Fifth Modification

Figure 8:
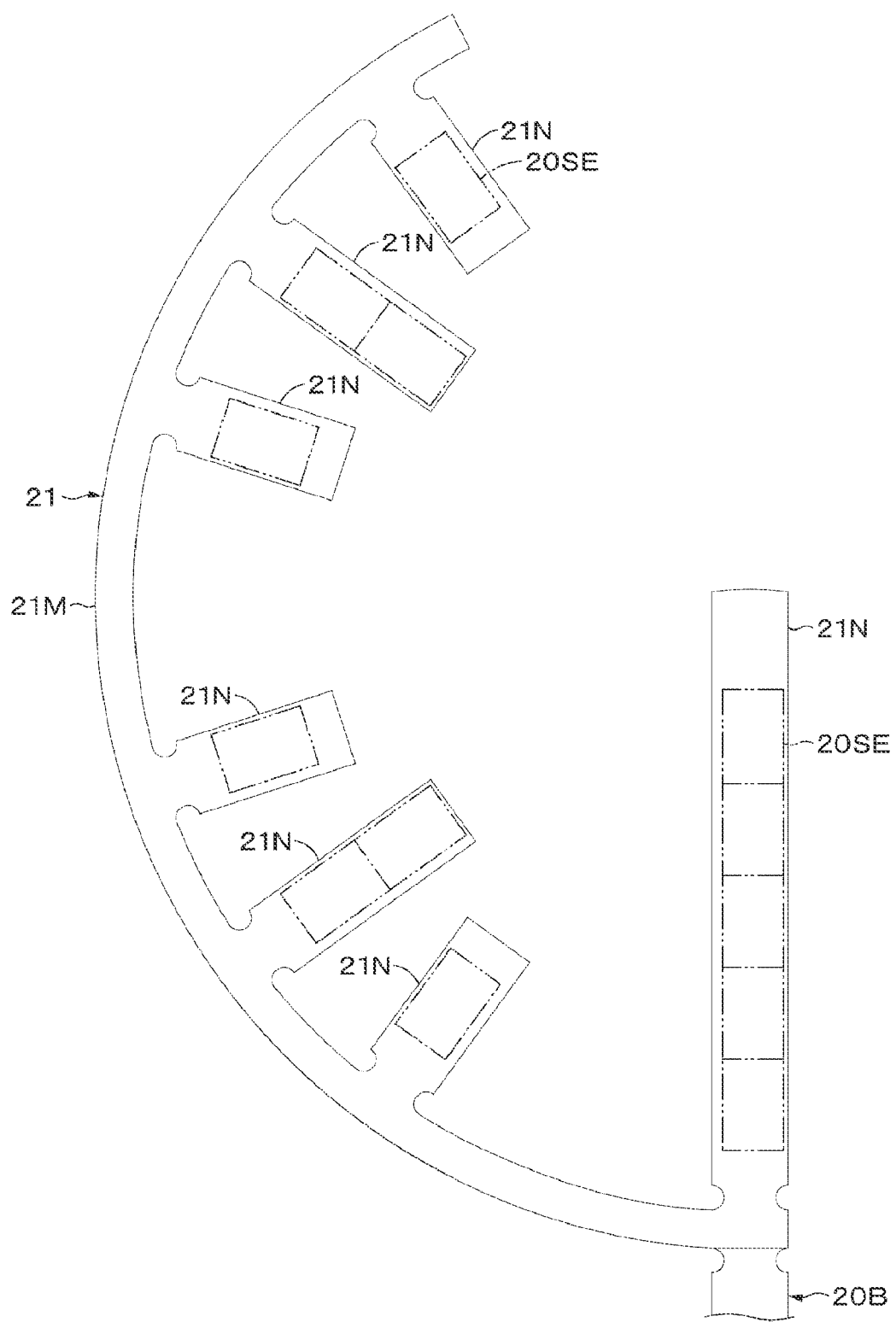
FIG. 8 is a plan view showing the configuration of the sensor electrode layer in a planar state.

The first embodiment described above has described the case where the longest extension part 21N of the plurality of extension parts 21N extends from the center of the periphery on the concavely curved side of the curved part 21M. However, the extension position of the longest extension part 21N is not limited to this position. For example, as shown in FIG. 8, the longest extension part 21N may extend from one end of the periphery on the concavely curved side of the curved part 21M. In this case, the connection part 20B may extend from one end of the periphery on the convexly curved side of the curved part 21M, and the longest extension part 21N and the connection part 20B may have a linear shape.

Sixth Modification

Figure 10:
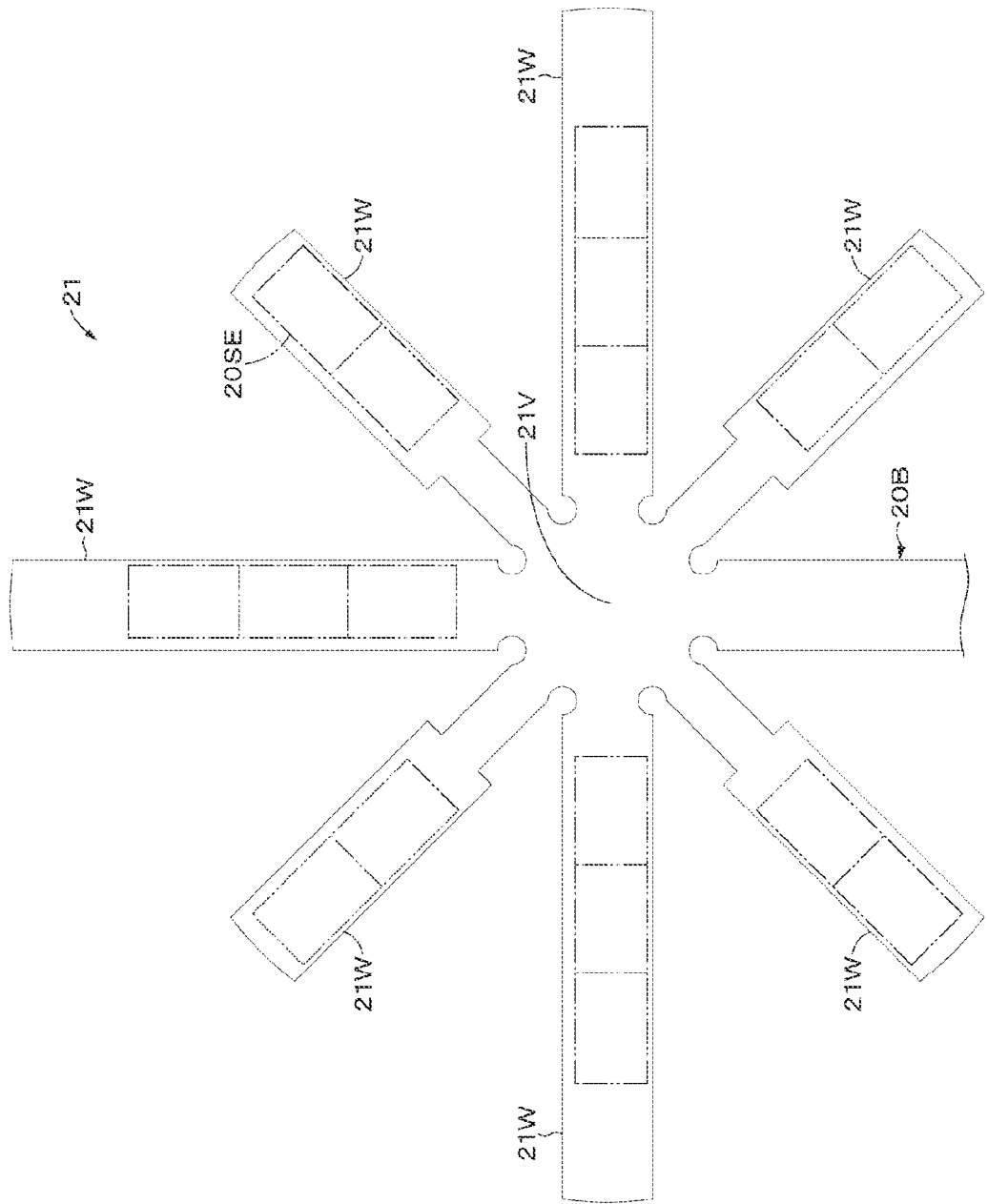
FIG. 10 is a plan view showing the configuration of the sensor electrode layer in a planar state.

The above-described first embodiment has described the case where the sensor electrode layer 21 includes the curved part 21M and the plurality of extension parts 21N, but the configuration of the sensor electrode layer 21 is not limited to this example. For example, as shown in FIG. 10, the sensor electrode layer 21 may include a central part 21V and a plurality of extension parts 21W extending radially from the central part 21V. The extension parts 21W each include one or more sensing parts 20SE. A plurality of wires (not shown) drawn out from the plurality of sensing parts 20SE is connected to the connection terminal 20C (see FIG. 5) through the central part 21V and the connection part 20B.

Seventh Modification

Figure 11:
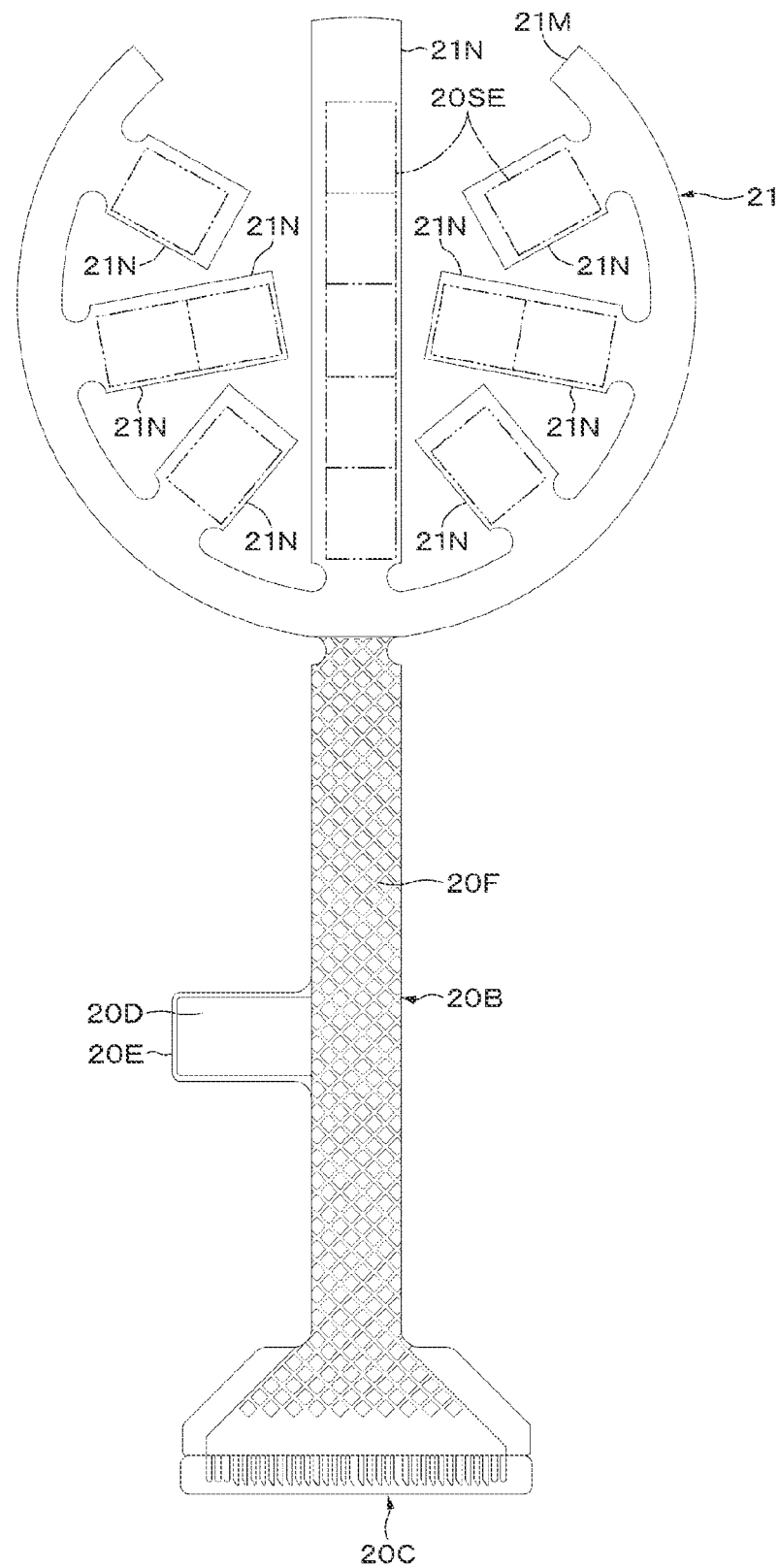
FIG. 11 is a plan view showing the configuration of the sensor electrode layer and the connection part in a planar state.

As shown in FIG. 11, the connection part 20B may further include a mesh-shaped conductive layer 20F on both surfaces of the connection part 20B. Specifically, the connection part 20B may further include the mesh-shaped conductive layer 20F on the protective layer 21B provided on one surface of the base material 21A and on the other surface of the base material 21A. Since the conductive layer 20F is provided on both surfaces of the connection part 20B, it is possible to suppress external noise (external electric field) from entering the wires 21E and 21F from both surfaces of the connection part 20B. Therefore, it is possible to suppress a decrease in detection accuracy or erroneous detection of the sensor 20 due to the external noise.

Note that the shape of the conductive layer 20F may be a geometric pattern other than the mesh shape, or the conductive layer 20F may be a thin film provided on both surfaces of the connection part 20B. However, considering flexibility of the connection part 20B and the like, the shape of the conductive layer 20F is preferably a mesh shape. As the material of the conductive layer 20F, a material similar to the material of the REF electrode layers 22B and 23B can be exemplified.

Eighth Modification

There may be no base material 22A. That is, the sensor 20 may include the REF electrode layer 22B instead of the electrode base material 22. Similarly, there may be no base material 23A. That is, the sensor 20 may include the REF electrode layer 23B instead of the electrode base material 23. In this case, the REF electrode layer 23B may be an exterior body of the electronic device 10 (for example, housing) and the like.

2. Second Embodiment

[Configuration of Sensor]

Figure 12:
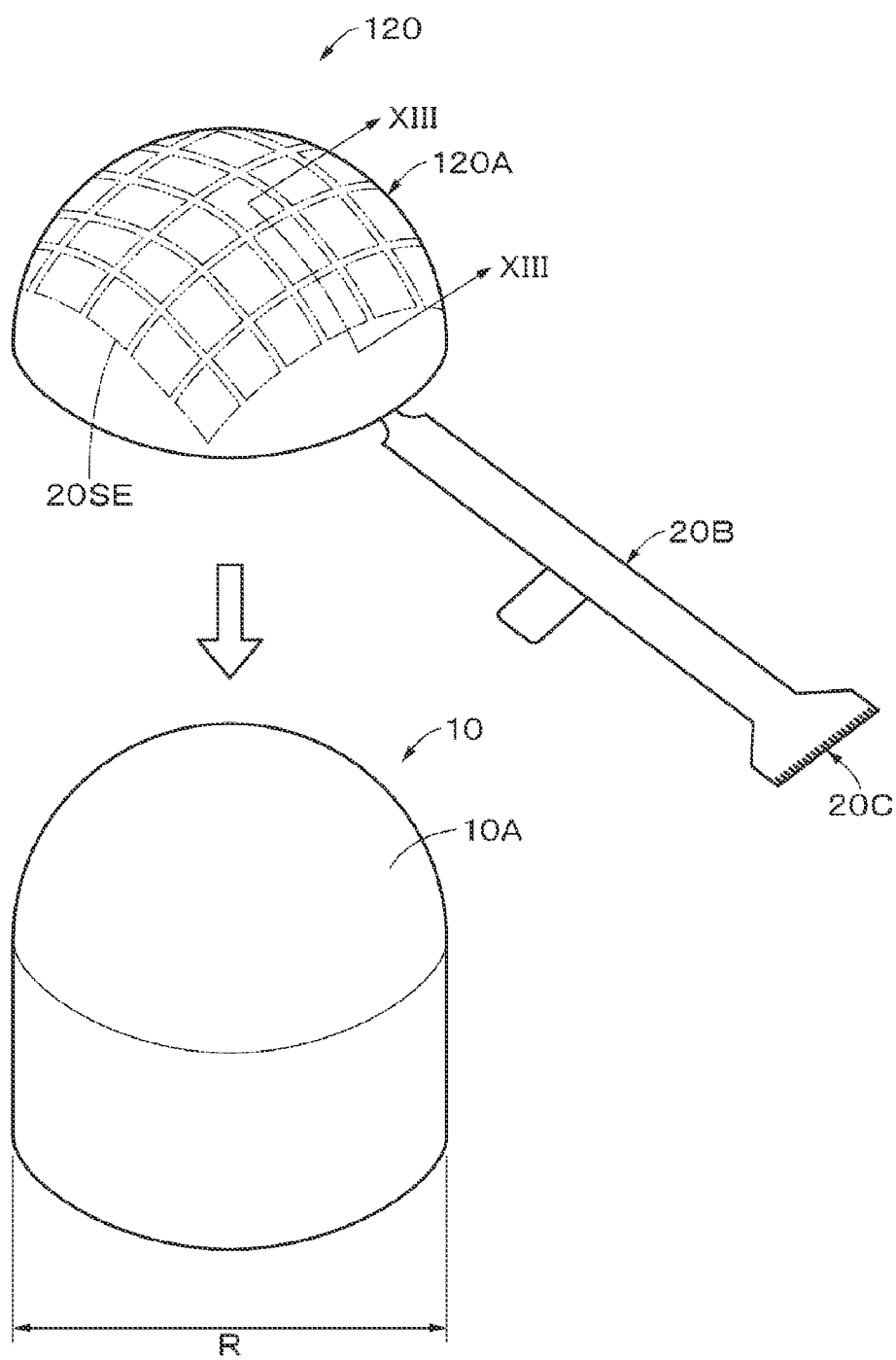
FIG. 12 is a perspective view of a sensor according to a second embodiment of the present disclosure.

FIG. 12 is a perspective view of a sensor 120 according to a second embodiment of the present disclosure. The sensor 120 differs from the sensor 20 according to the first embodiment in that the sensor 120 includes a sensor body 120A including a plurality of sensing parts 20SE arranged in a matrix instead of the sensor body 20A (see FIG. 2).

Figure 13:
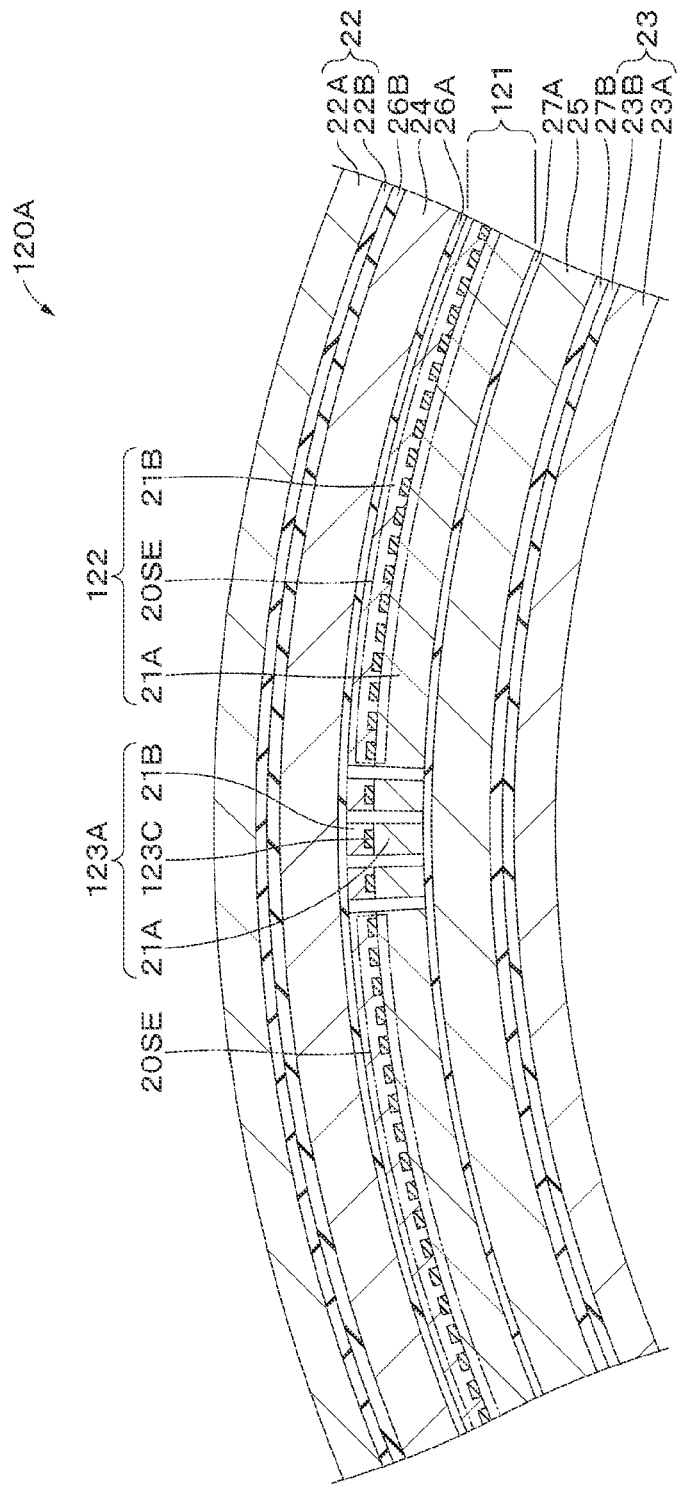
FIG. 13 is a cross-sectional view showing a configuration of a sensor body.

FIG. 13 is a cross-sectional view taken along the line XIII-XIII of FIG. 12. The sensor body 120A differs from the sensor body 20A according to the first embodiment in that the sensor body 120A includes a sensor electrode layer 121 instead of the sensor electrode layer 21 (see FIG. 4).

Figure 14:
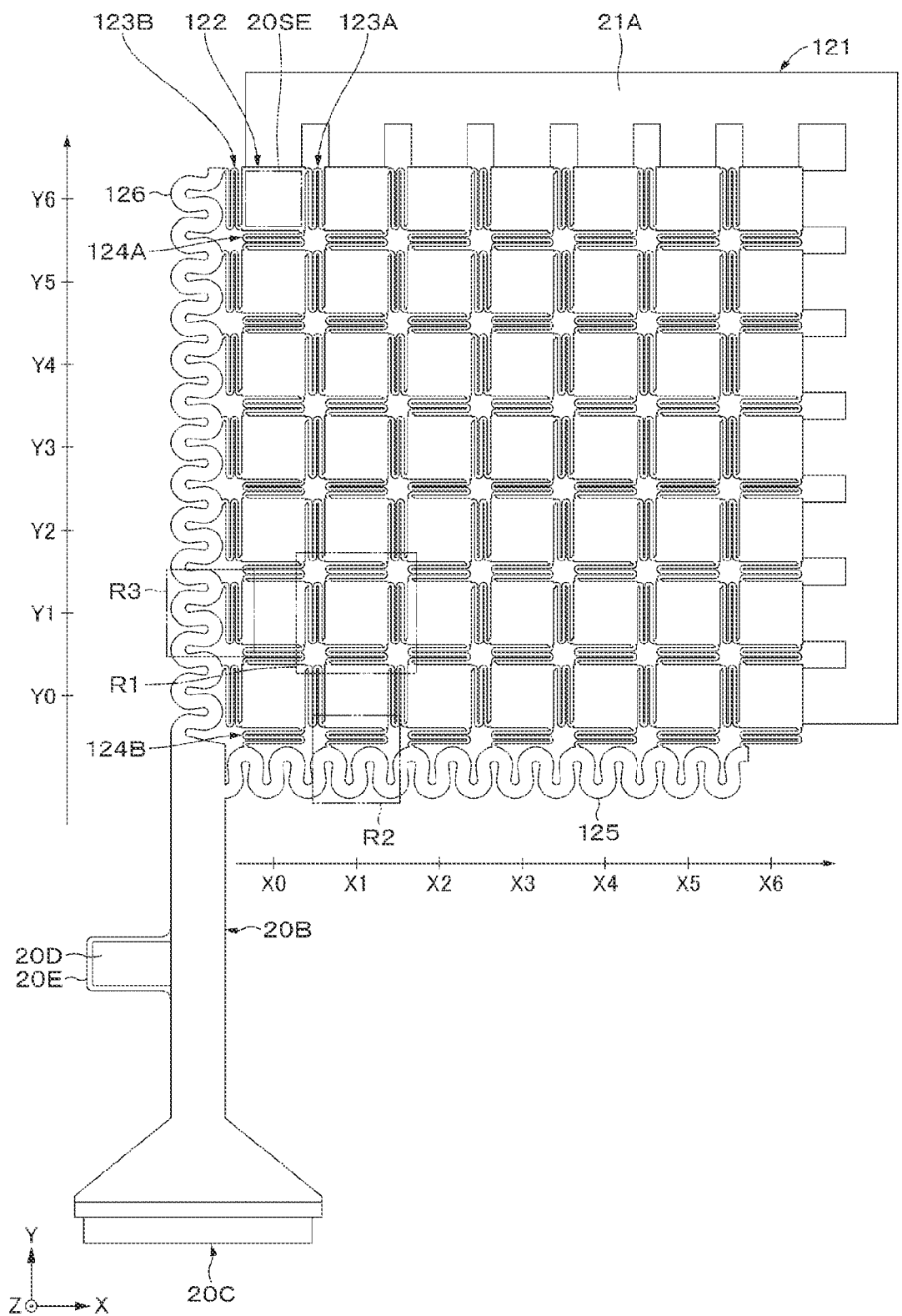
FIG. 14 is a plan view showing a configuration of a sensor electrode layer and a connection part in a planar state.

FIG. 14 is a plan view showing a configuration of the sensor electrode layer 121 in a planar state. The sensor electrode layer 121 includes a plurality of island parts 122, a plurality of bridge parts 123A, a plurality of bridge parts 123B, a plurality of bridge parts 124A, a plurality of bridge parts 124B, a bezel part 125, and a bezel part 126. Note that in this specification, axes orthogonal to each other in a plane of the sensor electrode layer 121 in a planar state are referred to as an X-axis and a Y-axis, and an axis perpendicular to a main surface of the sensor electrode layer 121 is referred to as a Z axis.

The plurality of island parts 122, the plurality of island parts 122, the plurality of bridge parts 123A, the plurality of bridge parts 123B, the plurality of bridge parts 124A, the plurality of bridge parts 124B, the bezel part 125, and the bezel part 126 are integrally configured using one base material 21A. The plurality of island parts 122, the plurality of island parts 122, the plurality of bridge parts 123A, the plurality of bridge parts 123B, the plurality of bridge parts 124A, the plurality of bridge parts 124B, the bezel part 125, and the bezel part 126 may be integrally configured using one FPC. By integrally configuring respective parts in this way, the number of parts of the sensor 120 can be reduced. Furthermore, impact durability of connection of each part can be improved.

(Island Part)

Each island part 122 includes one sensing part 20SE. The plurality of island parts 122 is two-dimensionally arranged in X-axis and Y-axis directions (first and second directions), specifically in a matrix. The island part 122 in plan view from the Z-axis direction has a square shape.

Figure 15:
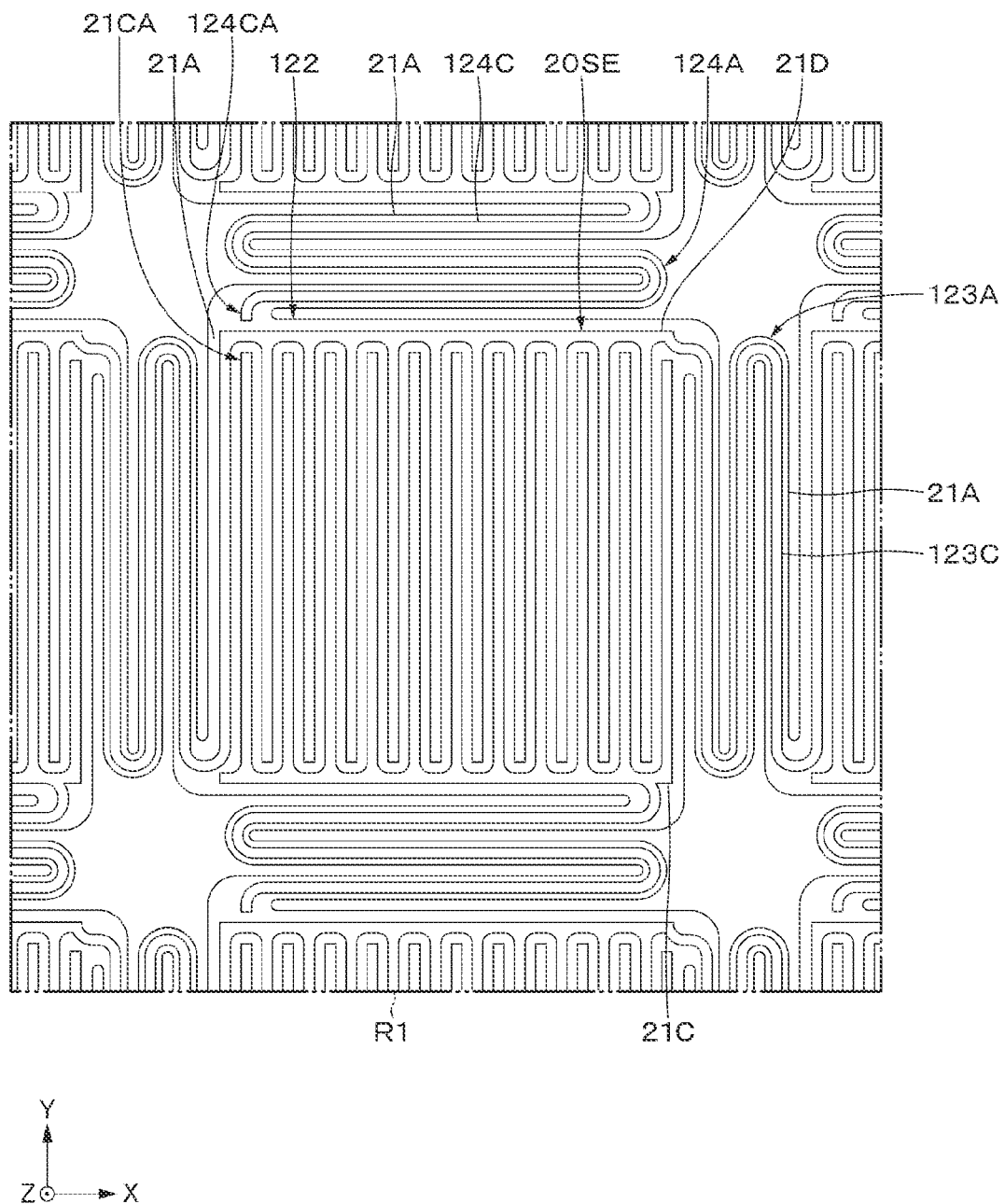
FIG. 15 is an enlarged plan view showing a region R1 of FIG. 14.

FIG. 15 is an enlarged plan view showing a region R1 of FIG. 14. The island part 122 includes the base material 21A, the sensing part 20SE, and a protective layer 21B, in a similar manner to the extension part 21N in the first embodiment. The sensing part 20SE includes a pulse electrode 21C and a sense electrode 21D. Note that illustration of the protective layer 21B is omitted in FIG. 15.

(Bridge Part)

The bridge part 123A is provided between the island parts 122 adjacent in the X-axis direction and couples the island parts 122 adjacent in the X-axis direction. The bridge part 123B is provided between the island part 122 and the bezel part 126 adjacent in the X-axis direction, and couples the island part 122 and the bezel part 126 adjacent in the X-axis direction. The bridge parts 123A and 123B have a configuration elastic in the X-axis direction. The bridge parts 123A and 123B in plan view from the Z-axis direction have a meandering shape. In the present specification, the meandering shape also includes a wavelike shape such as a sine wave shape, a triangular wave shape, and a rectangular wave shape.

The bridge part 124A is provided between the island parts 122 adjacent in the Y-axis direction and couples the island parts 122 adjacent in the Y-axis direction. The bridge part 124B is provided between the island part 122 and the bezel part 125 adjacent in the Y-axis direction, and couples the island part 122 and the bezel part 125 adjacent in the Y-axis direction. The bridge parts 124A and 124B have a configuration elastic in the Y-axis direction. The bridge parts 124A and 124B in plan view from the Z-axis direction have a meandering shape.

The bridge parts 123A and 123B include the base material 21A, a wire 123C, and the protective layer 21B. The wire 123C is provided on one surface of the base material 21A. The protective layer 21B is provided on one surface of the base material 21A to cover the wire 123C. The wire 123C electrically connects the sense electrodes 21D included in the island parts 122 adjacent in the X-axis direction.

The bridge parts 124A and 124B include the base material 21A, a wire 124C, and the protective layer 21B. The wire 124C is provided on one surface of the base material 21A. The protective layer 21B is provided on one surface of the base material 21A to cover the wire 124C. The wire 124C electrically connects the pulse electrodes 21C included in the island parts 122 adjacent in the Y-axis direction. Through holes (not shown) are provided at a tip 124CA of the wire 124C and a tip 21CA of the pulse electrode 21C. The wire 124C and the pulse electrode 21C are connected on the other surface of the base material 21A via these through holes.

(Bezel Part)

The bezel part 125 is provided around the plurality of island parts 122 arranged in a matrix. Specifically, the bezel part 125 is provided adjacent to a row of the island part 122 located at one end of the Y-axis direction and is parallel to the row of the island parts 122. The bezel part 126 is provided adjacent to a column of the island part 122 located at one end of the X-axis direction and is parallel to the column of the island parts 122.

The bezel part 125 is a connection part that connects the wire 124C provided in the bridge part 124B and a wire 21E provided in a connection part 20B (see FIG. 5). The bezel part 125 has a configuration elastic in the X-axis direction. The bezel part 125 has a meandering shape.

Figure 16A:
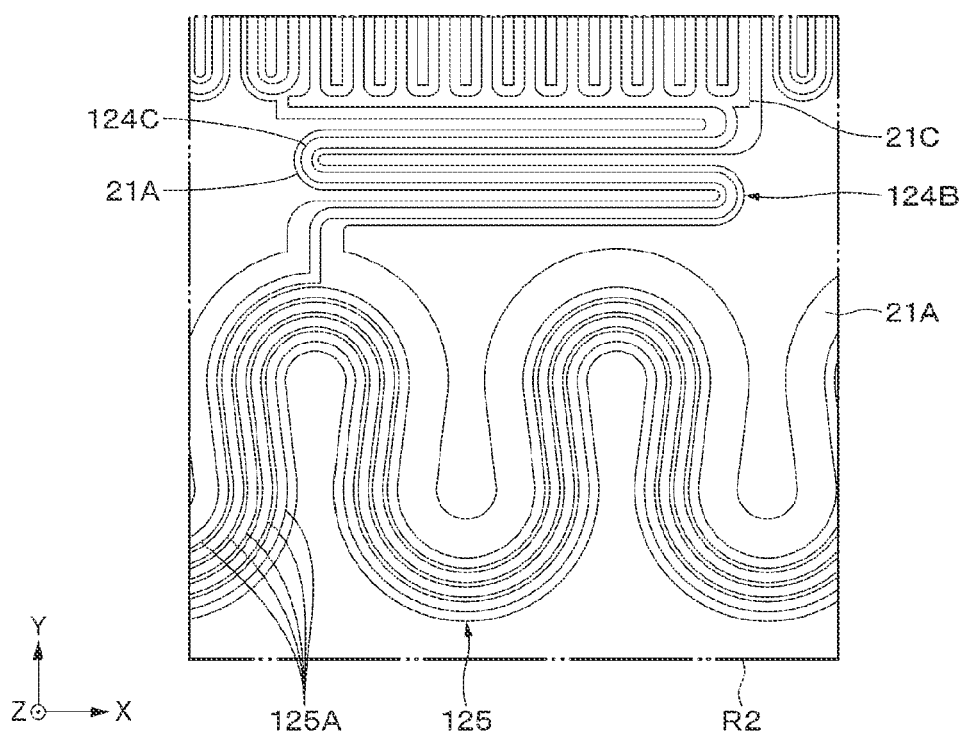
FIG. 16A is an enlarged plan view showing a region R2 of FIG. 14.

FIG. 16A is an enlarged plan view showing a region R2 of FIG. 14. Note that illustration of the protective layer 21B is omitted in FIG. 16A. The bezel part 125 includes the base material 21A, wires 125A, and the protective layer 21B. The wires 125A are provided on one surface of the base material 21A. The protective layer 21B is provided on one surface of the base material 21A to cover the wires 125A. The wires 125A connect the wire 124C provided in the bridge part 124B and the wire 21E provided in the connection part 20B (see FIG. 5).

The bezel part 126 is a connection part that connects the wire 123C provided in the bridge part 123B and a wire 21F provided in the connection part 20B (see FIG. 5). The bezel part 126 has a configuration elastic in the Y-axis direction. The bezel part 126 has a meandering shape.

Figure 16B:
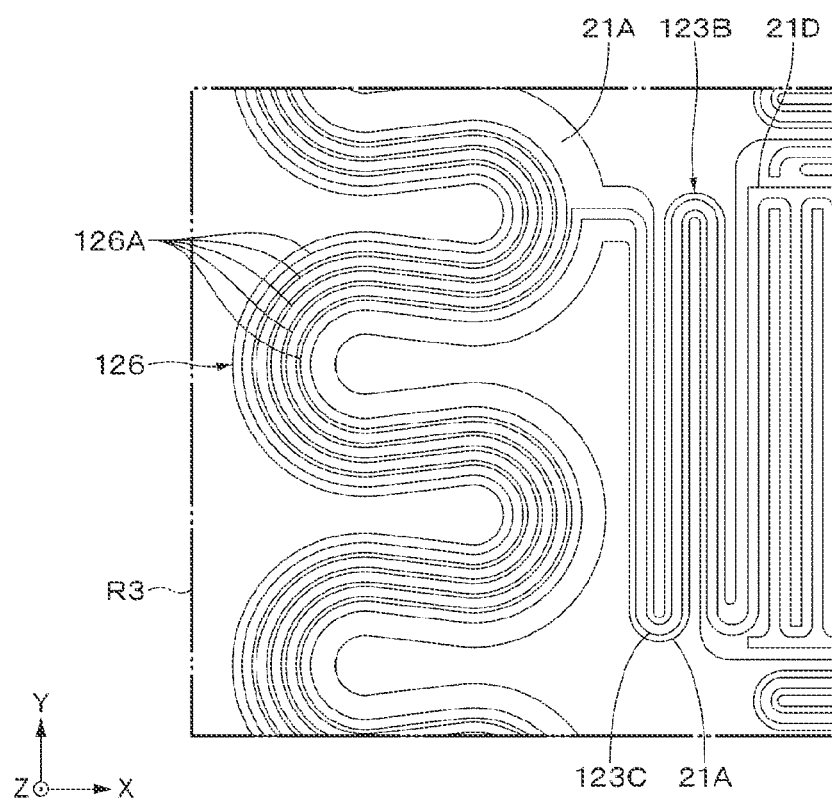
FIG. 16B is an enlarged plan view showing a region R3 of FIG. 14.

FIG. 16B is an enlarged plan view showing a region R3 of FIG. 14. Note that illustration of the protective layer 21B is omitted in FIG. 16B. The bezel part 126 includes the base material 21A, wires 126A, and the protective layer 21B. The wires 125A are provided on one surface of the base material 21A. The protective layer 21B is provided on one surface of the base material 21A to cover the wires 126A. The wires 125A connect the wires 125A provided in the bridge part 124B and the wire 21F provided in the connection part 20B (see FIG. 5).

Advantageous Effects

As described above, in the sensor 120 according to the second embodiment, the island parts 122 adjacent in the X-axis direction are coupled with the bridge part 123A having a configuration elastic in the X-axis direction. Furthermore, the island parts 122 adjacent in the Y-axis direction are coupled with the bridge part 124A having a configuration elastic in the Y-axis direction. With this arrangement, the sensor electrode layer 121 can be extended, together with the REF electrode layers 22B and 23B, the elastic layer 24, and the gap layer 25. Therefore, the sensor 120 can be mounted on the curved surface part 10A having a convexly curved surface shape while being extended. Therefore, effects similar to effects of the sensor 20 according to the first embodiment can be obtained.

MODIFICATIONS

First Modification

The above-described second embodiment has described the case where the island part 122 includes one sensing part 20SE, but the island part 122 may include a plurality of the sensing parts 20SE.

Second Modification

The above-described second embodiment has described the case where the bridge parts 123A and 123B and the bridge parts 124A and 124B in plan view from the Z-axis direction have a meandering shape. However, the shape of the bridge parts 123A and 123B and the bridge parts 124A and 124B in plan view from the Z-axis direction is not limited to this shape, and may have an S-shape, a spiral shape, or the like. Here, the spiral shape means a spiral shape having two adjacent island parts 122 as the center of the spiral.

The above-described second embodiment has described the case where the island part 122 in plan view from the Z-axis direction has a square shape. However, the island part 122 may have a quadrangle shape other than a square shape, a polygonal shape other than a square shape, a circular shape, an elliptical shape, or the like.

3. Application Example

[Example of Electronic Device]

At least one type of the sensors 20 and 120 according to the first and second embodiments and modifications thereof is applicable to various electronic devices. Application is possible to, for example, personal computers, mobile phones such as smartphones, televisions, remote controllers, cameras, game machines, navigation systems, e-books, electronic dictionaries, portable music players, keyboards, wearable terminals, radios, stereos, medical devices, robots, or the like. Examples of the wearable terminal include smart watches, head mound displays, cloth, or the like.

[Example Other than Electronic Device]

At least one type of the sensors 20 and 120 according to the first and second embodiments and modifications thereof is applicable to various items other than the electronic devices. Application is possible to, for example, electrical devices such as electric tools, refrigerators, air conditioners, water heaters, microwave ovens, dishwashers, washing machines, dryers, lighting devices, toys, or the like. Moreover, application is possible to buildings such as houses, building materials, vehicles, furniture such as tables and desks, manufacturing apparatuses, analytical instruments, or the like. Examples of the vehicle include cars (for example, automobiles, motorcycles, and the like), ships, submarines, railway vehicles, aircrafts, spacecrafts, elevators, play equipment, or the like.

EXAMPLES

The present disclosure will be specifically described below by examples, but the present disclosure is not limited to only these examples. Note that in all the following examples, parts corresponding to the above-described embodiments are denoted with the same reference symbols.

In Examples 1 to 4, the sensor 20 with the plurality of sensing parts 20SE arranged radially around the top of the sensor body 20A (see FIG. 2) was manufactured. In the following description of Examples 1 to 4, the sensing part 20SE is specified using the coordinates (X, Y) shown in FIGS. 4 and 7. Note that the coordinates (X, Y) indicate the center position of the sensing part 20SE. The X-axis is an axis parallel to the extension direction of the extension part 21N in the sensor electrode layer 21 in a planar state. The Y-axis is an axis parallel to the circumferential direction of the arc-shaped curved part 21M in the sensor electrode layer 21 in a planar state.

Example 1

To begin with, by pasting each layer shown below on the spherical curved surface part 10A of the housing one layer at a time, the spherical sensor 20 having the configurations shown in FIGS. 2 and 3 was manufactured. Note that the base materials 22A and 23A were not used in the configuration.

REF electrode layer 22B: Stretchable conductive cloth (thickness 190 µm)

Adhesive layer 26B: Double-sided tape without base material (thickness 50 µm)

Elastic layer 24: Sheet with a polyurethane sponge layer formed on the elastomer base material (hereinafter referred to as "sponge sheet with base material") (thickness 500 µm)

Adhesive layer 26A: Double-sided tape without base material (thickness 25 µm)

Sensor electrode layer 21: FPC having the configuration shown in FIGS. 4 to 6 (thickness 100 µm)

Adhesive layer 27A: Double-sided tape with base material (thickness 30 µm)

Gap layer 25: Sponge sheet with base material (thickness 500 µm)

Adhesive layer 27B: Double-sided tape without base material (thickness 25 μm)

REF electrode layer 23B: Stretchable conductive cloth (thickness 190 μm)

Adhesive layer: Double-sided tape without base material (thickness 50 μm)

Figure 17:
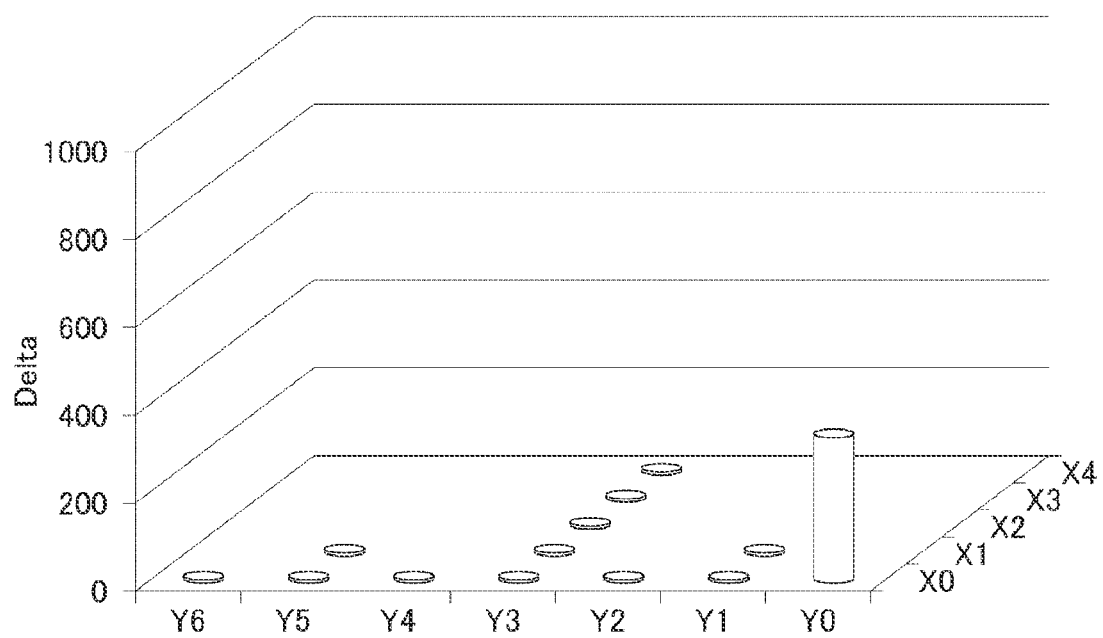
FIG. 17 is a graph showing evaluation results of the sensor according to Example 1.

Housing: Including ABS resin, diameter R of the housing (see FIG. 2)=33 mm, diameter SR of the spherical curved surface part 10A (see FIG. 2)=36 mm Next, the surface of the sensor 20 was visually observed. As a result, occurrence of wrinkles was not confirmed. Next, by using an indenter having a diameter of R=4.5 mm, the sensor output (delta value) corresponding to the amount of change in capacitance when the sensing part 20SE located at the coordinates (X0, Y0) is pressed with 50 gf was acquired. The result is shown in FIG. 17.

Figure 18A:
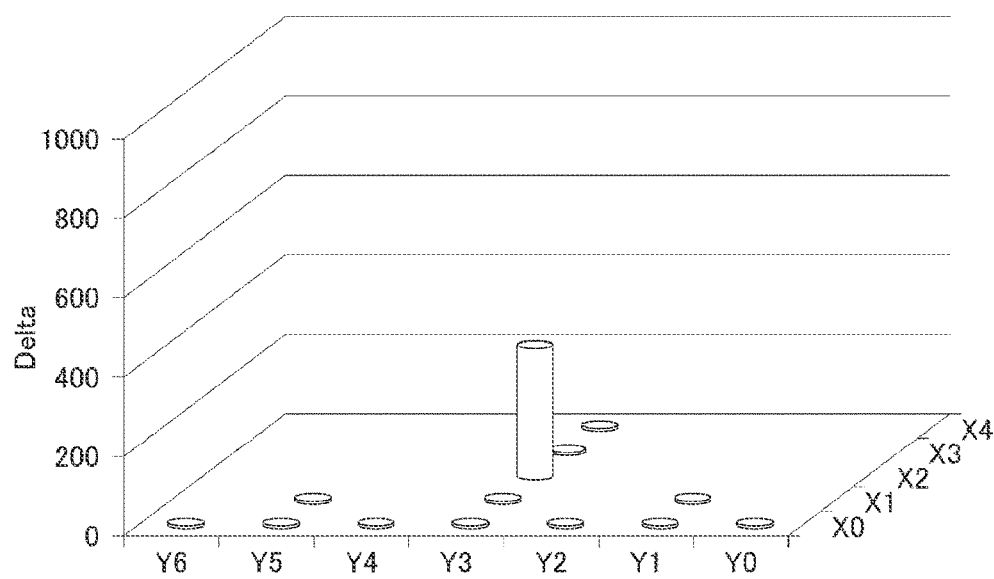
FIGS. 18A and 18B are graphs showing the evaluation results of the sensor according to Example 1.
Figure 18B:
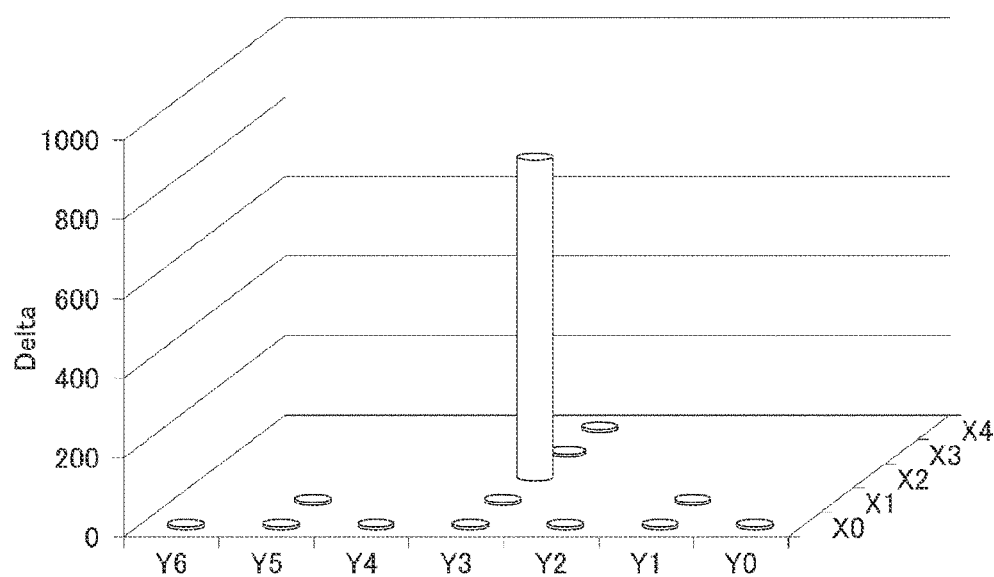

Furthermore, by using the indenter having a diameter of R=4.5 mm, the sensor output (delta value) corresponding to the amount of change in capacitance when the sensing part 20SE located at the coordinates (X2, Y3) is pressed with 50 gf, 200 gf was acquired. The result is shown in FIG. 18A (output value when pressed with 50 g) and FIG. 18B (output value when pressed with 200 gf).

Example 2

As the housing on which the sensor 20 is mounted, a housing including ABS resin and having a diameter of the housing of R=33 mm and a diameter of the spherical curved surface part 10A of SR=18 mm was used. Furthermore, as the sensor electrode layer 21, an FPC having the configuration shown in FIG. 7 was used. The sensor 20 was manufactured on the curved surface part 10A in a similar manner to Example 1 other than these items.

Figure 19:
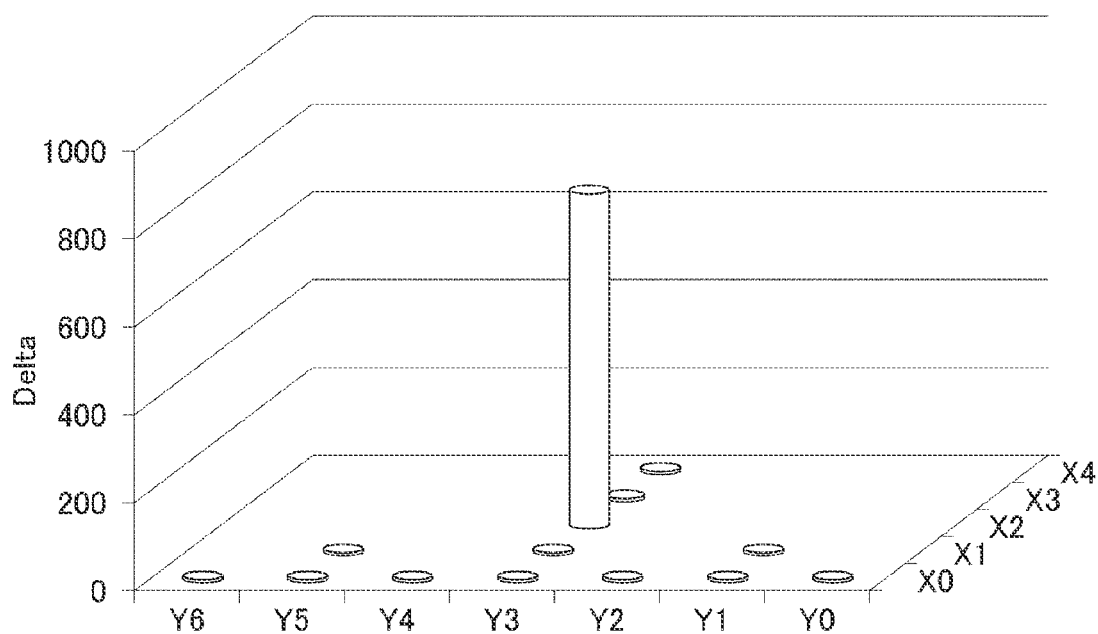
FIG. 19 is a graph showing evaluation results of the sensor according to Example 2.

Next, the surface of the sensor 20 was visually observed. As a result, occurrence of wrinkles was not confirmed. Next, by using the indenter having a diameter of R=4.5 mm, the sensor output (delta value) corresponding to the amount of change in capacitance when the sensing part 20SE located at the coordinates (X2, Y3) is pressed with 200 gf was acquired. The result is shown in FIG. 19.

Example 3

The sensor 20 was manufactured on the curved surface part 10A in a similar manner to Example 1 except that a polyurethane sponge sheet (thickness 300 μm) without base material was used as the elastic layer 24 and the gap layer 25.

Next, the surface of the sensor 20 was visually observed. As a result, occurrence of wrinkles was not confirmed. Next, the sensor output (delta value) corresponding to the amount of change in capacitance when the sensing part 20SE located at the coordinates (X2, Y3) is pressed with 200 gf was acquired. As a result, results almost similar to Example 1 were obtained.

Example 4

The sensor 20 was manufactured on the curved surface part 10A in a similar manner to Example 2 except that a polyurethane sponge sheet (thickness 300 μm) without base material was used as the elastic layer 24 and the gap layer 25.

Next, the surface of the sensor 20 was visually observed. As a result, occurrence of wrinkles was not confirmed. Next, the sensor output (delta value) corresponding to the amount of change in capacitance when the sensing part 20SE located at the coordinates (X2, Y3) is pressed with 200 gf was acquired. As a result, results almost similar to Example 2 were obtained.

As can be seen from FIGS. 17, 18A, 18B, and 19, by mounting the sensor 20 on the spherical curved surface part 10A, the pressure acting on the curved surface part 10A can be detected with good sensitivity, and the pressed position can be detected with high accuracy.

Furthermore, as can be seen from evaluation results of the sensor output of Examples 3 and 4, even in a case where the sponge sheet without the base material is used as the elastic layer 24 and the gap layer 25, in a similar manner to the case where the sponge sheet with the base material is used as the elastic layer 24 and the gap layer 25, the pressure acting on the curved surface part 10A can be detected with good sensitivity, and the pressed position can be detected with high accuracy.

In Examples 5 and 6, the sensor 20 with the plurality of sensing parts 20SE arranged in a matrix (see FIG. 12) was manufactured. In Examples 2 and 3, the sensing part 20SE is specified using the coordinates (X, Y) shown in FIG. 14. Note that the coordinates (X, Y) indicate the center position of the sensing part 20SE. The X-axis is an axis parallel to the row direction of the plurality of island parts 122 arranged in a matrix in the sensor electrode layer 121 in a planar state. The Y-axis is an axis parallel to the column direction of the plurality of island parts 122 arranged in a matrix in the sensor electrode layer 121 in a planar state.

Example 5

Figure 20:
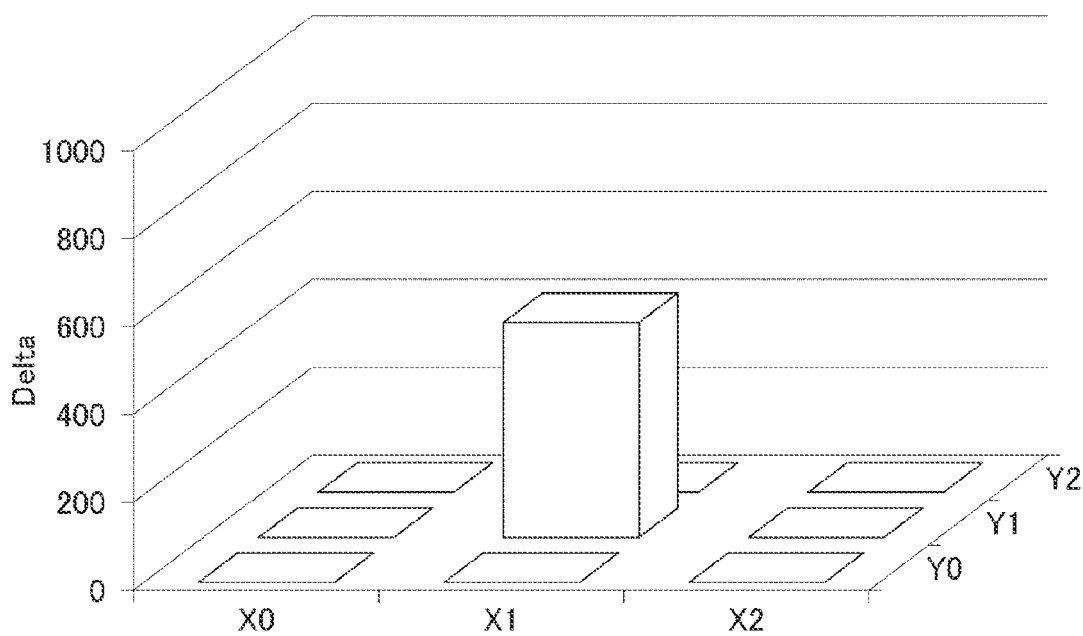
FIG. 20 is a graph showing evaluation results of the sensor according to Example 5.

As the sensor electrode layer 121, an FPC (100 μm) having the configurations shown in FIGS. 14, 15, 16A, and 16B was used. Furthermore, as the adhesive layer 27A, a double-sided tape with the base material (thickness 25 μm) was used. However, unlike in FIG. 14, the matrix array of the island parts 122 was set to 3 rows×3 columns. With other items similar to Example 1, the sensor 120 having the configurations shown in FIGS. 12 and 13 was manufactured on the curved surface part 10A Next, the surface of the sensor 20 was visually observed. As a result, occurrence of wrinkles was not confirmed. Next, the sensor output (delta value) corresponding to the amount of change in capacitance when the sensing part 20SE located at the coordinates (X1, Y1) is pressed with 200 gf was acquired. The result is shown in FIG. 20.

Example 6

With items other than setting the matrix array of the island parts 122 to 5 rows×5 columns similar to Example 5, the sensor 120 was manufactured on the curved surface part 10A.

Next, the surface of the sensor 20 was visually observed. As a result, occurrence of wrinkles was not confirmed. Next, the sensor output (delta value) corresponding to the amount of change in capacitance when the sensing part 20SE located at the coordinates (X2, Y2) is pressed with 200 gf was acquired. The result is shown in FIG. 21.

Figure 21:
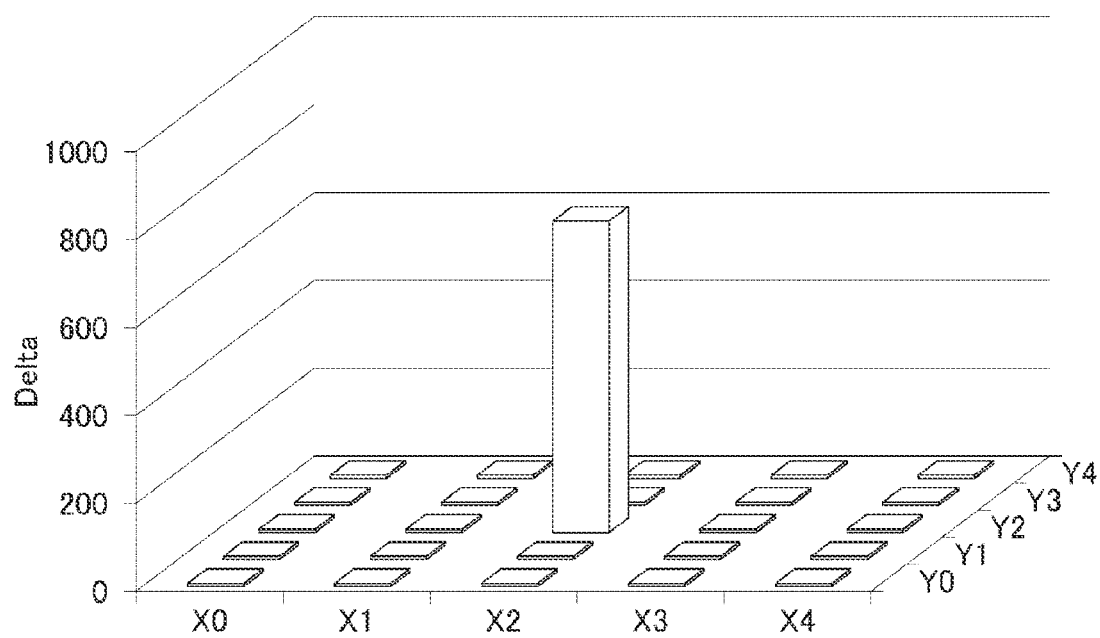
FIG. 21 is a graph showing evaluation results of the sensor according to Example 6.

As can be seen from FIGS. 20 and 21, by mounting the sensor 120 on the spherical curved surface part 10A, the pressure acting on the curved surface part 10A can be detected with good sensitivity, and the pressed position can be detected with high accuracy.

The first and second embodiments of the present disclosure and the modifications thereof have been specifically described above. However, the present disclosure is not limited to the above-described first and second embodiments and the modifications thereof, and various modifications based on the technical idea of the present disclosure can be made.

For example, the configurations, methods, processes, shapes, materials, numerical values, and the like mentioned in the first and second embodiments and the modifications thereof are merely examples. If necessary, different configurations, methods, processes, shapes, materials, numerical values, and the like may be used.

The configurations, methods, processes, shapes, materials, numerical values, and the like of the first and second embodiments and the modifications thereof described above can be combined with each other without departing from the spirit of the present disclosure.

Out of the materials exemplified in the first and second embodiments and the modifications thereof described above, one type can be used alone or two or more types can be used in combination, unless otherwise specified.

Furthermore, the present disclosure can also adopt the following configurations.

(1)

A pressure sensor having a convexly curved surface shape and including:
a capacitive sensor electrode layer including a plurality of sensing parts;
a first reference electrode layer having elasticity and facing a first surface of the sensor electrode layer;
a second reference electrode layer having elasticity and facing a second surface of the sensor electrode layer;
an elastic layer having elasticity and provided between the first reference electrode layer and the sensor electrode layer; and
a gap layer having elasticity and provided between the second reference electrode layer and the sensor electrode layer, in which
the sensor electrode layer includes:
a curved part; and
a plurality of extension parts extending from a concavely curved side of the curved part, and
the extension parts include the sensing parts.

(2)

The pressure sensor according to (1), in which the first reference electrode layer and the second reference electrode layer include slits.

(3)

The pressure sensor according to (1) or (2), in which the elastic layer and the gap layer include slits.

(4)

The pressure sensor according to any one of (1) to (3), in which the convexly curved surface shape is one of a spherical shape and an aspherical shape.

(5)

The pressure sensor according to any one of (1) to (4), in which the sensor electrode layer has non-elasticity.

(6)

The pressure sensor according to any one of (1) to (5), in which
the sensor electrode layer further includes a plurality of wires each connected to the plurality of sensing parts, and
the curved part includes the plurality of wires.

(7)

The pressure sensor according to (6), further including a connection part extending from a convexly curved side of the curved part, in which
the connection part includes the plurality of wires.

(8)

The pressure sensor according to (7), in which the connection part and the sensor electrode layer include one base material.

(9)

The pressure sensor according to any one of (1) to (8), in which the elastic layer includes foamed resin or elastomer.

(10)

The pressure sensor according to any one of (1) to (9), in which the first reference electrode layer and the second reference electrode layer include conductive cloth.

(11)

The pressure sensor according to any one of (1) to (10), in which one of the plurality of sensing parts is located at a top of the convexly curved surface shape.

(12)

The pressure sensor according to any one of (1) to (11), in which
the sensor electrode layer includes:
a first electrode including a plurality of first sub-electrodes; and
a second electrode including a plurality of second sub-electrodes, and
each of the sensing parts includes the plurality of first sub-electrodes and the plurality of second sub-electrodes arranged alternately at a distance.

(13)

The pressure sensor according to any one of (1) to (11), in which
the sensor electrode layer includes:
a first electrode having a comb-like shape; and
a second electrode having a comb-like shape, and
each of the sensing parts includes the first electrode and the second electrode arranged with the comb-like shapes meshed each other.

(14)

A pressure sensor including:
a capacitive sensor electrode layer including a plurality of sensing parts;
a first reference electrode layer facing a first surface of the sensor electrode layer;
a second reference electrode layer having elasticity and facing a second surface of the sensor electrode layer;
an elastic layer provided between the first reference electrode layer and the sensor electrode layer; and
a gap layer provided between the second reference electrode layer and the sensor electrode layer, in which
the sensor electrode layer includes:
a plurality of island parts arranged in a matrix; and
a plurality of bridge parts having an elastic configuration and coupling the adjacent island parts, and
the island parts include the sensing parts.

(15)

The pressure sensor according to (14), in which the bridge parts have a meandering shape.

(16)

The pressure sensor according to (14) or (15), in which
the sensor electrode layer further includes a bezel part provided around a plurality of the island parts arranged in the matrix, and
the bezel part has an elastic configuration.

(17)

The pressure sensor according to (16), further including a plurality of bridge parts having an elastic configuration and coupling the bezel part and a plurality of the island parts adjacent to the bezel part.

(18)

The pressure sensor according to (16) or (17), in which the bezel part has a meandering shape.

(19)

An electronic device including:

an exterior body including a curved surface part having a convexly curved surface shape; and the pressure sensor according to any one of (1) to (18) provided on the curved surface part.

(20)

The electronic device according to (19), in which the curved surface part has a spherical shape or an aspherical shape.

REFERENCE SIGNS LIST

10 Electronic device
10A Curved surface part
11 Sensor module
12 Host device
13 Controller IC
20, 120 Sensor
20A, 120A Sensor body
20B Connection part
20C Connection terminal
20D Ground electrode
20E Protrusion
20F Conductive layer
20SE Sensing part
21 Sensor electrode layer
21A Base material
21B Protective layer
21C Pulse electrode (first electrode)
21D Sense electrode (second electrode)
$21C_1$, $21D_1$ Sub-electrode
21E, 21F, 123C, 124C, 125A, 126A wire
21M Curved part
21N, 21W Extension part
21V Central part
22, 23 Electrode base material
22A, 23A Base material
22B, 23B Reference electrode layer
24 Elastic layer
25 Gap layer
26A, 26B, 27A, 27B Adhesive layer
122 Island part
123A, 123B, 124A, 124B Bridge part
125, 126 Bezel part
R1, R2, R3 Region

The invention claimed is:

1. A pressure sensor having a convexly curved surface shape, the pressure sensor comprising:

a capacitive sensor electrode layer including a plurality of sensing parts;

a first reference electrode layer having elasticity and facing a first surface of the capacitive sensor electrode layer;

a second reference electrode layer having elasticity and facing a second surface of the capacitive sensor electrode layer;

an elastic layer having elasticity and provided between the first reference electrode layer and the capacitive sensor electrode layer; and a gap layer having elasticity and provided between the second reference electrode layer and the capacitive sensor electrode layer, wherein the capacitive sensor electrode layer includes:

a curved part; and a plurality of extension parts extending from a concavely curved side of the curved part, and the extension parts include the plurality of sensing parts.

2. The pressure sensor according to claim 1, wherein the first reference electrode layer and the second reference electrode layer include slits.

3. The pressure sensor according to claim 1, wherein the elastic layer and the gap layer include slits.

4. The pressure sensor according to claim 1, wherein the convexly curved surface shape is one of a spherical shape and an aspherical shape.

5. The pressure sensor according to claim 1, wherein the capacitive sensor electrode layer has non-elasticity.

6. The pressure sensor according to claim 1, wherein the capacitive sensor electrode layer further includes a plurality of wires each connected to the plurality of sensing parts, and the curved part includes the plurality of wires.

7. The pressure sensor according to claim 6, further comprising a connection part extending from a convexly curved side of the curved part, wherein the connection part includes the plurality of wires.

8. The pressure sensor according to claim 7, wherein the connection part and the capacitive sensor electrode layer include one base material.

9. The pressure sensor according to claim 1, wherein the elastic layer includes foamed resin or elastomer.

10. The pressure sensor according to claim 1, wherein the first reference electrode layer and the second reference electrode layer include conductive cloth.

11. The pressure sensor according to claim 1, wherein one of the plurality of sensing parts is located at a top of the convexly curved surface shape.

12. The pressure sensor according to claim 1, wherein the capacitive sensor electrode layer includes:

a first electrode including a plurality of first sub-electrodes; and a second electrode including a plurality of second sub-electrodes, and each of the plurality of sensing parts includes the plurality of first sub-electrodes and the plurality of second sub-electrodes arranged alternately at a distance.

13. The pressure sensor according to claim 1, wherein the capacitive sensor electrode layer includes:

a first electrode having a comb-like shape; and a second electrode having a comb-like shape, and each of the plurality of sensing parts includes the comb-like shape of the first electrode meshed with the comb-like shape of the second electrode.

14. A pressure sensor comprising:

a capacitive sensor electrode layer including a plurality of sensing parts;

a first reference electrode layer facing a first surface of the capacitive sensor electrode layer;

a second reference electrode layer having elasticity and facing a second surface of the capacitive sensor electrode layer;

an elastic layer provided between the first reference electrode layer and the capacitive sensor electrode layer; and a gap layer provided between the second reference electrode layer and the capacitive sensor electrode layer, wherein the capacitive sensor electrode layer includes:

a plurality of island parts arranged in a matrix; and a plurality of bridge parts having an elastic configuration and coupling adjacent island parts of the plurality of island parts, and the plurality of island parts includes the plurality of sensing parts.

15. The pressure sensor according to claim 14, wherein the bridge parts have a meandering shape.

16. The pressure sensor according to claim 14, wherein the capacitive sensor electrode layer further includes a bezel part provided around the plurality of island parts arranged in the matrix, and the bezel part has an elastic configuration.

17. The pressure sensor according to claim 16, wherein the plurality of bridge parts having an elastic configuration and coupling the bezel part and the plurality of island parts adjacent to the bezel part.

18. The pressure sensor according to claim 16, wherein the bezel part has a meandering shape.

19. An electronic device comprising:

an exterior body including a curved surface part having a convexly curved surface shape; and the pressure sensor according to claim 1 provided on the curved surface part.

20. The electronic device according to claim 19, wherein the curved surface part has a spherical shape or an aspherical shape.

* * * * *